US012761237B2

(12) United States Patent
Sakata et al.

(10) Patent No.: US 12,761,237 B2
(45) Date of Patent: Oct. 13, 2026

(54) AUTOMATIC ANALYZER

(71) Applicant: Hitachi High-Tech Corporation, Tokyo (JP)

(72) Inventors: Kenshiro Sakata, Tokyo (JP); Yoshihiro Kabe, Tokyo (JP); Takuya Takahashi, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 546 days.

(21) Appl. No.: 18/277,102

(22) PCT Filed: Feb. 24, 2022

(86) PCT No.: PCT/JP2022/007499

§ 371 (c)(1),
(2) Date: Aug. 14, 2023

(87) PCT Pub. No.: WO2022/196272

PCT Pub. Date: Sep. 22, 2022

(65) Prior Publication Data

US 2024/0125812 A1 Apr. 18, 2024

(30) Foreign Application Priority Data

Mar. 16, 2021 (JP) ................................ 2021-042221

(51) Int. Cl.
*G01N 35/10* (2006.01)

(52) U.S. Cl.
CPC ..... *G01N 35/1011* (2013.01); *G01N 35/1065* (2013.01)

(58) Field of Classification Search
CPC ........... G01N 35/1011; G01N 35/1065; G01N 2035/0439; G01N 35/1074; G01N 2035/1048
See application file for complete search history.

(56) References Cited

U.S. PATENT DOCUMENTS

2004/0023223 A1 2/2004 Thompson et al.
2009/0226344 A1* 9/2009 Nishida ............. G01N 35/1011 422/63

(Continued)

FOREIGN PATENT DOCUMENTS

EP 2098871 B1 12/2018
EP 3761040 A1 1/2021

(Continued)

OTHER PUBLICATIONS

International Search Report, PCT/JP2022/007499, Apr. 5, 2022, 2 pgs.

(Continued)

*Primary Examiner* — Jennifer Wecker
*Assistant Examiner* — Britney N. Washington
(74) *Attorney, Agent, or Firm* — Volpe Koenig

(57) ABSTRACT

An automatic analyzer includes a dispensing mechanism having at least one horizontal drive shaft and one vertical drive shaft for moving the dispensing nozzle, a first mechanism having a stop position at which the dispensing nozzle is stopped, and a control section for positioning the dispensing nozzle with the stop position of the first mechanism. A member is disposed on the first mechanism to indicate predetermined first and second positions of the first mechanism so that the first and the second positions are detected by sensing the member using the dispensing nozzle. Based on the displacement between the first and the second positions indicating the displacement of the relative position between the dispensing mechanism and the first mechanism, the control section calculates a correction value for correcting the displacement of the stop position caused by fluctuation in a relative position between the dispensing mechanism and the first mechanism.

13 Claims, 18 Drawing Sheets

(56) References Cited

U.S. PATENT DOCUMENTS

| | | | | |
|---|---|---|---|---|
| 2014/0093426 | A1* | 4/2014 | Hirano | G01N 35/1011 422/67 |
| 2014/0199779 | A1 | 7/2014 | Yasui et al. | |
| 2015/0114140 | A1 | 4/2015 | Okuyama et al. | |
| 2016/0327587 | A1 | 11/2016 | Yasui et al. | |
| 2020/0025784 | A1 | 1/2020 | Fujii et al. | |
| 2020/0241026 | A1* | 7/2020 | Sakairi | G01N 35/1002 |

FOREIGN PATENT DOCUMENTS

| | | | |
|---|---|---|---|
| JP | 11-160327 | A | 6/1999 |
| JP | 2010-249601 | A | 11/2010 |
| JP | 2015-087329 | A | 5/2015 |
| JP | 2017-075859 | A | 4/2017 |
| JP | 2018-146373 | A | 9/2018 |
| JP | 2020-056802 | A | 4/2020 |
| WO | 2013/042404 | A1 | 3/2013 |
| WO | 2016/132945 | A1 | 8/2016 |

OTHER PUBLICATIONS

Extended European Search Report issued on Jan. 31, 2025 for European Patent Application No. 22771030.8.

* cited by examiner

AUTOMATIC ANALYZER

TECHNICAL FIELD

The present invention relates to an automatic analyzer having a dispensing mechanism.

BACKGROUND ART

The following documents disclose the adjustment of a stop position of a dispensing nozzle.

In PTL 1, a reagent rack is provided with a pin made of metal that serves as a mark for positioning a reagent dispensing probe. A control section stores in advance information indicating a relative positional relationship between a pin and a mouth of the reagent container. When the position of the pin is detected by the reagent dispensing probe, the control section determines the position indicated by the information indicating the relative positional relationship stored in advance from the detected position of the pin as the suction position. Furthermore, the heat insulating lid of the reagent storage is a partly detachable lid, and thus searching for the pin with the probe is performed by removing only the detachable lid, so that the reagent storage can be kept warm.

In addition, in PTL 2, it is disclosed that a position adjustment jig provided with a conductive projecting portion is attached to a container installation portion or the like, and a capacitance sensor provided in the dispensing portion searches for the position adjustment jig to obtain a reference position.

CITATION LIST

Patent Literature

PTL 1: JP2010-249601A
PTL 2: JP2015-87329A

SUMMARY OF INVENTION

Technical Problem

In PTL 1, the positional information of the mouth of the reagent container stored by the control section is a relative positional relationship with the position of one pin. Therefore, if the relative positional relationship between the reagent storage and the dispensing mechanism is distorted, the aspiration position determined based on the detected pin position may not be an appropriate aspiration position. In addition, since it is necessary to remove the detachable lid from the reagent storage before position adjustment in order to prepare a space for the reagent dispensing probe to search for the pin, the entire process of position adjustment cannot be automatically completed.

In addition, in PTL 2, with respect to position adjustment of a dispensing portion, it is considered that the position adjustment jig attached during a position adjustment process has a shape that can be inserted into holding holes of a specimen container installation portion and a reagent container installation portion, which are stop positions of the dispensing portion, and thus the set reference positions are the stop positions. Therefore, proper dispensing is ensured for the reference position. However, since it is necessary to attach and detach the position adjustment jig before and after the position adjustment, the entire process of position adjustment cannot be automatically completed. There is no disclosure of how to determine positions of stop positions other than the stop position that is considered as the reference position (holding hole in which a jig is not installed).

Solution to Problem

An automatic analyzer, which is one embodiment of the invention, includes a mechanism base; a dispensing mechanism which is disposed on the mechanism base, and has at least one horizontal drive shaft and one vertical drive shaft for moving a dispensing nozzle; a first mechanism which is disposed on the mechanism base, and has a stop position at which the dispensing nozzle is stopped; a control section for positioning the dispensing nozzle with the stop position of the first mechanism; and a data storage section, in which a member indicating a predetermined first position and a predetermined second position of the first mechanism is disposed on the first mechanism; the horizontal drive shaft of the dispensing mechanism moves the dispensing nozzle in an XY plane; the vertical drive shaft of the dispensing mechanism moves the dispensing nozzle in a Z direction vertical to the XY plane; the data storage section stores a position adjustment value indicating an XY-plane position corresponding to the stop position, a position adjustment value indicating an XY-plane position of the member indicating the first position, and a position adjustment value indicating an XY-plane position of the member indicating the second position; the member is sensed by the dispensing nozzle to detect the first position and the second position; and the control section calculates a correction value of the position adjustment value indicating the XY-plane position corresponding to the stop position based on the stop position indicated in the position adjustment value indicating the XY-plane position stored in the data storage section, a positional relationship between the first position and the second position, and the XY-plane positions corresponding to the first and the second positions, which are detected using the dispensing nozzle.

Advantageous Effects of Invention

It is possible to automatically correct positional deviations based on fluctuations in the relative positions of the dispensing mechanism and the first mechanism in a short period of time. Problems, configurations, and effects other than those described above are clarified by the following description of the embodiments.

DESCRIPTION OF EMBODIMENTS

A mode for carrying out the present invention is described in detail based on the drawings. The embodiments described below are merely examples, and constituent elements and elemental steps thereof are not essential unless otherwise specified or obvious in principle.

Figure 1:
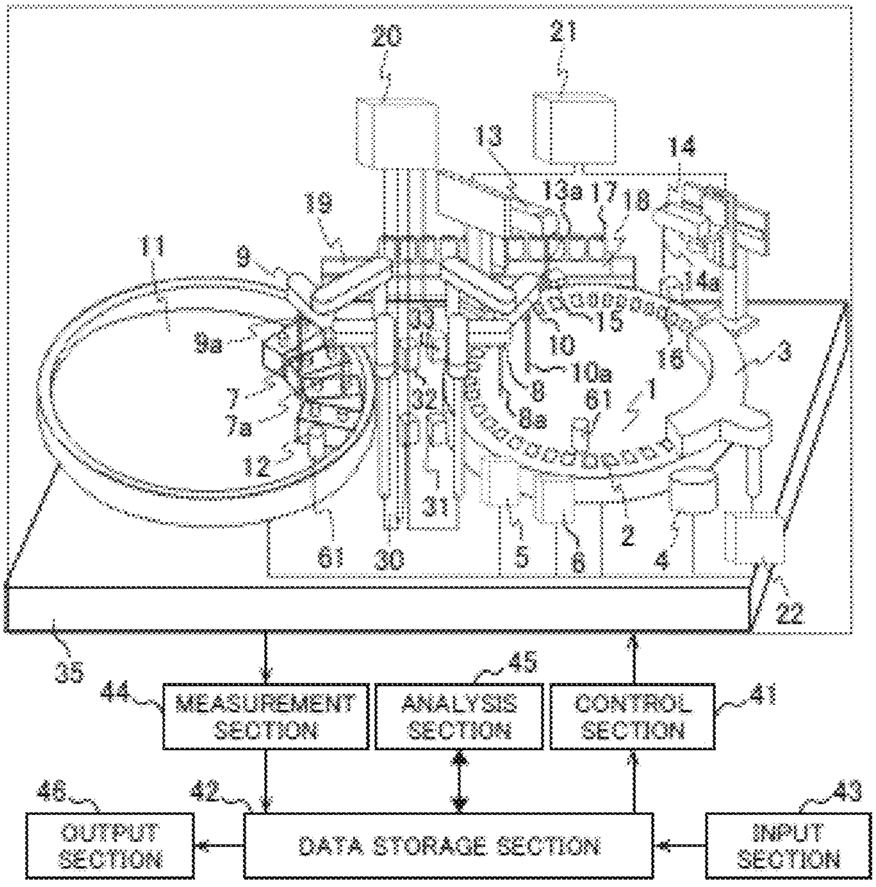
FIG. 1 illustrates an example of overall structure of an automatic analyzer.

FIG. 1 illustrates an overall exemplary structure of an automatic analyzer. As a main configuration, the automatic analyzer includes a sample transport mechanism 19, a reagent disc 11 on which reagent bottles 12 are mounted, a reaction disc 1 on which reaction vessels 2 are mounted, sample dispensing mechanisms 13 and 14, reagent dispensing mechanisms 7, 8, 9, and 10, stirring mechanisms 5 and 6, a spectrophotometer 4, a cleaning mechanism 3, cleaning vessels 15, 16, 30, 31, 32, and 33, a reagent pump 20, a sample pump 21, and a cleaning pump 22. Also, the automatic analyzer further includes a control section 41 that controls each unit of the automatic analyzer, a data storage section 42 that stores various kinds of data, an input section 43 that inputs necessary data to the data storage section 42 from the outside, a measurement section 44 that calculates an absorbance from the amount of light obtained by the spectrophotometer 4, an analysis section 45 that calculates a component amount from the absorbance, and an output section 46 that externally displays and outputs the analyzed component amount data and the like.

The sample transport mechanism 19 transports a rack (transport member) 18 in which one or more sample containers 17 containing samples (liquids) to be analyzed are mounted. The plurality of reagent bottles 12 containing reagents (liquids) used for analysis of the samples are arranged side by side in the circumferential direction on the reagent disc 11. The plurality of reaction vessels 2 in which the samples and the reagents are mixed and caused to react are arranged side by side in the circumferential direction on the reaction disc 1. The sample dispensing mechanisms 13 and 14 each dispense the samples from the sample container 17 transported to sample dispensing positions by the sample transport mechanism 19 to the reaction vessel 2. The reagent dispensing mechanisms 7, 8, 9, and 10 each dispense the reagents from the reagent bottle 12 to the reaction vessel 2. The stirring mechanisms 5 and 6 stir mixed liquids of the samples and the reagents (reaction liquids) dispensed to the reaction vessel 2. The spectrophotometer 4 receives transmitted light or scattered light obtained from a light source (not illustrated) via the reaction liquid of the reaction vessel 2. The cleaning mechanism 3 cleans the used reaction vessel 2. The sample nozzle cleaning vessels 15 and 16 each are arranged in operating ranges of the sample dispensing mechanisms 13 and 14 and clean sample nozzles 13*a* and 14*a* with washing water. Similarly, the reagent nozzle cleaning vessels 30, 31, 32, and 33 each are arranged in the operating ranges of the reagent dispensing mechanisms 7, 8, 9, and 10 and clean reagent nozzles 7*a*, 8*a*, 9*a*, and 10*a* with washing water. In addition, cylindrical members (cylinders) 61 that position the dispensing nozzles are arranged near the reagent dispensing mechanisms 7, 8, 9, and 10. The structure of the cylindrical member 61 and processing of using and positioning the cylindrical members 61 are described below.

The component amounts of the samples are analyzed in the following procedure. First, a sample in the sample container 17 placed on the rack 18 transported to the vicinity of the reaction disc 1 by the sample transport mechanism 19 is dispensed to the reaction vessel 2 on the reaction disc 1 by the sample nozzle 13*a* (14*a*) of the sample dispensing mechanism 13 (14). Next, the reagent used for analysis is dispensed from the reagent bottle 12 on the reagent disc 11 to the reaction vessel 2 to which the sample is previously dispensed by the reagent nozzle 7*a* (8*a*, 9*a*, 10*a*) of the reagent dispensing mechanism 7 (8, 9, 10). Subsequently, the mixed liquid of the sample and the reagent is stirred in the reaction vessel 2 by the stirring mechanism 5 (6). Thereafter, the measurement section 44 transmits the light generated from the light source to the reaction vessel 2 to which the stirred mixed liquid is introduced, measures the light intensity of the transmitted light or the scattered light by the spectrophotometer 4, and stores the obtained absorbance data to the data storage section 42. The analysis section 45 analyzes the stored absorbance data based on calibration curve data and the Lambert-Beer law. According to the analysis, the component amount included in the sample can be analyzed. The data necessary for the control or analysis of each unit of the automatic analyzer is input from the input section 43 to the data storage section 42, or various kinds of data or analysis results are displayed and/or output from the output section 46.

The above is the exemplary structure when the automatic analyzer performs biochemical analysis, and measurement mechanisms are different depending on the contents of the analysis performed by the automatic analyzer. As the measurement method used for the automatic analyzer, an analysis method using a reagent in which a color of a reaction liquid changes due to the reaction with the component to be analyzed in the sample (colorimetric analysis), or an analysis method in which a reagent obtained by adding labeled substances to materials that specifically bind directly or indirectly to components to be analyzed in the sample is used and the labeled substances are counted (immunoassay) are known. However, all include a process of dispensing a sample contained in the sample container or a reagent contained in the reagent bottle to the reaction vessel by the dispensing mechanism and performing mixing. The dispensing mechanism according to this example can be applied to an automatic analyzer that can perform analysis including a dispensing process.

Figure 2:
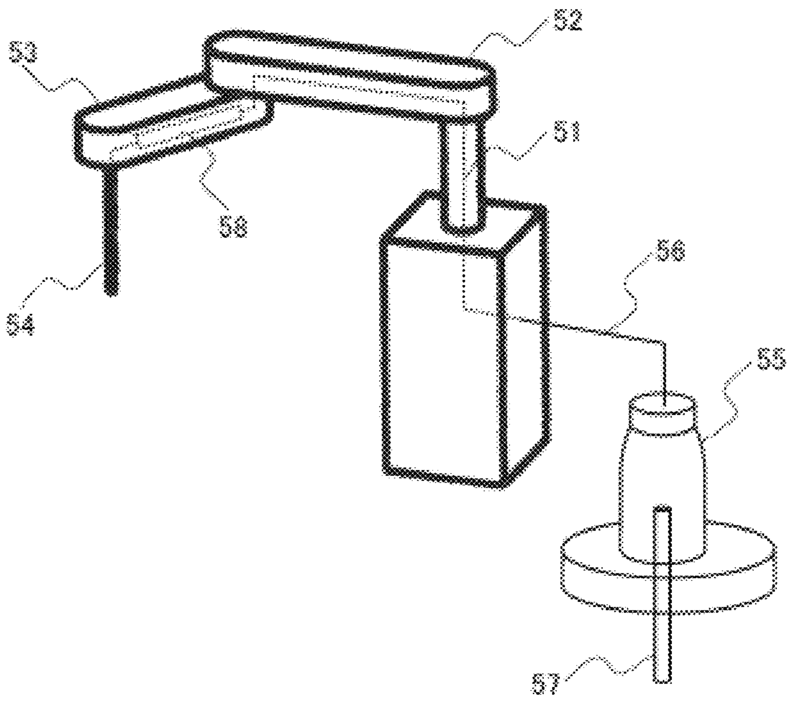
FIG. 2 illustrates an exemplary structure of a dispensing mechanism having two horizontal drive shafts.

FIG. 2 illustrates an exemplary structure of the dispensing mechanism according to the first to fourth examples. In this dispensing mechanism, one end portion of a $\theta_1$ arm 52 is attached, rotatably in an XY plane, to an upper end position of a shaft 51 that can be driven vertically (in a Z axis direction). Also, one end portion of a $\theta_2$ arm 53 is attached, rotatably in an XY plane, to the other end portion that is a free end of the $\theta_1$ arm 52. A dispensing nozzle 54 is attached to the other end portion that is a free end of the $\theta_2$ arm 53 so as to extend downward in the Z axis direction. The Z axis direction is a direction vertical to the XY plane. In addition, the dispensing nozzle 54 and a syringe 55 are connected to each other via a tube 56. The tube 56 is connected to one end side of the dispensing nozzle 54 from the pedestal of the shaft 51 via the shaft 51, the $\theta_1$ arm 52, and the $\theta_2$ arm 53. A plunger 57 is movably attached to the syringe 55 for varying an internal volume thereof. Depending on the movement position of the plunger 57, the sample or reagent is aspirated or expelled from the tip of the dispensing nozzle 54. In addition, a contact detector 58 of a capacitance type is connected to the dispensing nozzle 54 and can detect that the dispensing nozzle 54 is in contact with a conductor such as a sample or a reagent.

Figure 3:
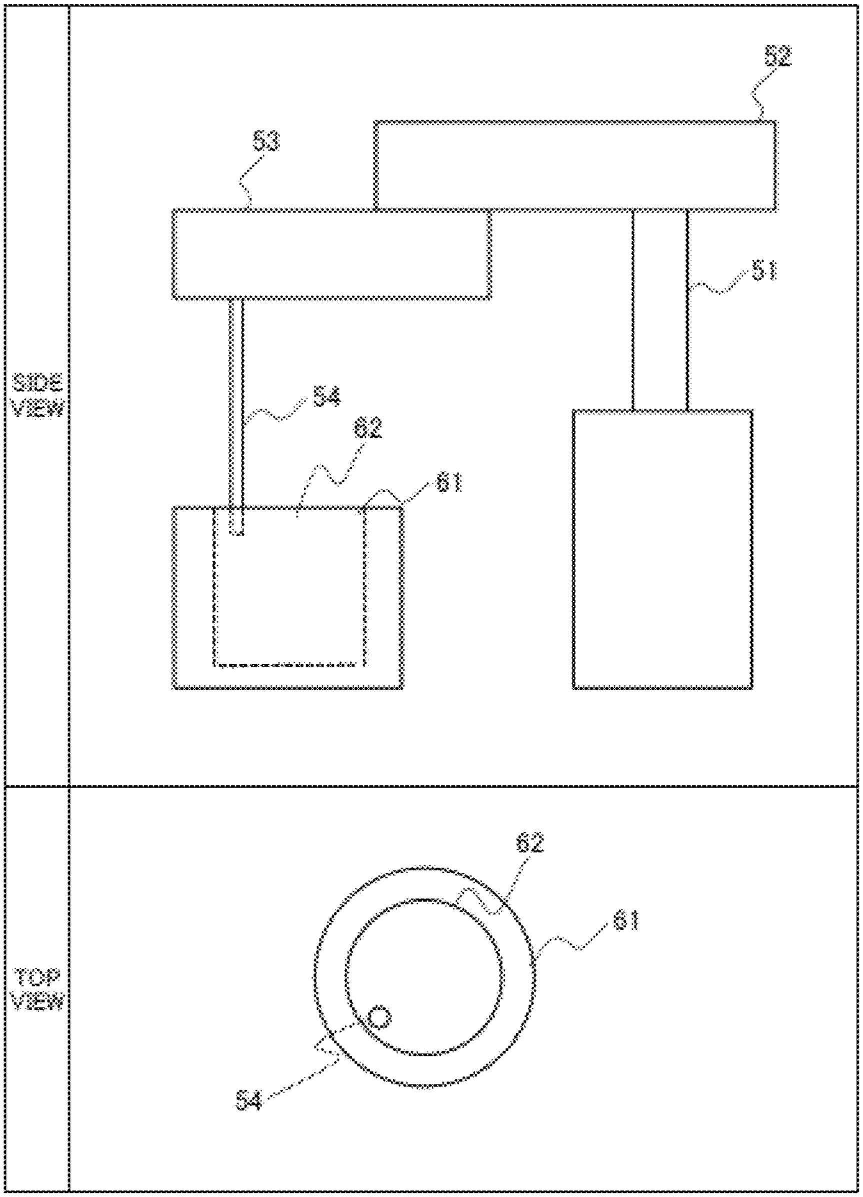
FIG. 3 illustrates a state where a dispensing nozzle is in contact with a cylindrical member.

FIG. 3 illustrates a state in which the dispensing nozzle 54 is in contact with an inner wall surface 62 of the cylindrical member (hereinafter, simply referred to as cylinder) 61. The cylinder 61 is a member for positioning the dispensing nozzle 54 and is installed on the reaction disc 1 and the reagent disc 11 of the automatic analyzer (see FIG. 1). Here, the upper part of FIG. 3 is a view (side view) seen in the horizontal direction, and the lower part is a view (top view) seen in the vertical direction.

In this example, the dispensing nozzle 54 is brought into contact with the inner wall surface 62 of the cylinder 61 at least three points, and the relative position of the dispensing mechanism and the center position of the cylinder 61 is calculated from the movement amount of the $\theta_1$ arm 52 and the $\theta_2$ arm 53 at this point. Here, the reason why the number of contact points is set to be three or more is because the center position of the cylinder 61 is estimated only from the position of the points on the inner circumference in consideration of variations in the inner diameter of the cylinder 61. If the relative position between the dispensing mechanism and the reaction disc 1 or the reagent disc 11 changes, the movement amount of the $\theta_1$ arm 52 and the $\theta_2$ arm 53 when the dispensing nozzle 54 comes into contact with the inner wall surface 62 of the cylinder 61 on the reaction disc 1 or the reagent disc 11 changes. The positional information can be estimated with high accuracy by specifying the position in a state in which the dispensing nozzle 54 is actually in contact with the cylinder 61.

Figure 4A:
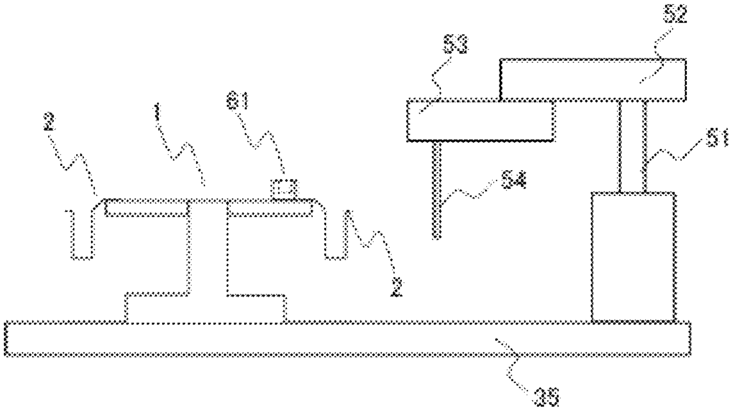
FIG. 4A illustrates the dispensing mechanism and a reaction disc when a mechanism base is in a normal state.
Figure 4B:
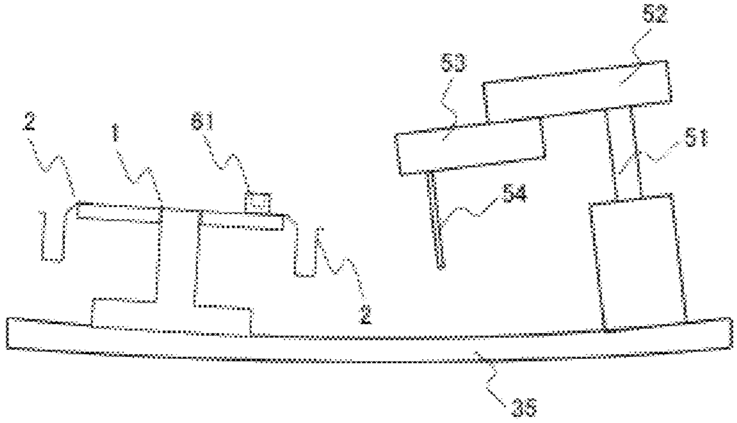
FIG. 4B illustrates the dispensing mechanism and the reaction disc when the mechanism base is warped.
Figure 4C:
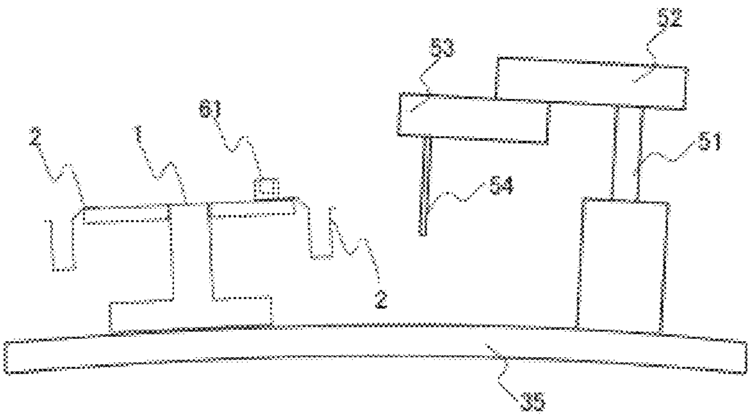
FIG. 4C illustrates the dispensing mechanism and the reaction disc when the mechanism base is warped.

The main cause of changes in the relative positions between the dispensing mechanism and the reaction disc 1 or the reagent disc 11 is that the load balance of the entire automatic analyzer changes due to transportation, change in time, or the like, to distort a mechanism base 35. FIGS. 4A to 4C illustrate a relative position between the dispensing mechanism and the reaction disc 1 that is changed due to the state of the mechanism base 35.

FIG. 4A illustrates that the mechanism base 35 is in the normal state. At the time of installation of the automatic analyzer, positioning between the dispensing nozzle 54 and the reaction vessel 2 and the reagent bottle 12 is performed. In the positioning at the time of the installation, position adjustment values for absorbing errors during manufacturing and assembly are obtained by an actual machine per stop position of the dispensing nozzle 54 and are stored in the data storage section 42 as the positional information data. At the time of this positioning, also for the cylinder 61 attached to each of the reaction disc 1 and the reagent disc 11, the dispensing nozzle 54 is brought into contact with the inner circumference of the cylinder 61, to calculate each of the center position. The center position of the cylinder 61 in the calculated normal state is stored in the data storage section 42 as the position adjustment value of the cylinder 61.

Examples in which the mechanism base 35 is in a distorted state are illustrated in FIGS. 4B and 4C. Since the dispensing mechanism and the reaction disc 1 and the reagent disc 11 each are installed in different positions on the mechanism base 35, relative positions thereof are deviated due to the warpage of the mechanism base 35. Therefore, if the movement amounts of the $\theta_1$ arm 52 and the $\theta_2$ arm 53 are not corrected by this deviation, the dispensing nozzle 54 cannot be moved to correct positions of the reaction vessel 2 and the reagent bottle 12. Also, both the reaction vessel 2 and the cylinder 61 as dispensing targets are installed in the reaction disc 1, and both the reagent bottle 12 and the cylinder 61 as dispensing targets are installed in the reagent disc 11. Therefore, the relative position is not likely to be deviated due to the influence of the warpage of the mechanism base 35. Therefore, the deviation amount of the relative position between the dispensing mechanism and the reaction disc 1 or the reagent disc 11 is obtained by using the cylinder 61 and can be set as the correction value of the position adjustment value for the dispensing position.

The cylinder 61 may be made of metal. This is because the contact detector 58 in the capacitance type that is originally mounted in the dispensing mechanism is utilized to sense whether the dispensing nozzle 54 is in contact with the liquid surface of the specimen or the reagent. Therefore, the contact between the dispensing nozzle 54 and the cylinder 61 can be sensed without adding a new sensor or a circuit board. This is just an example, and as a contact detector that detects a contact between the dispensing nozzle 54 and a liquid surface, a continuity detector, a pressure detector, a collision detection detector, and a laser displacement detector are known. This example can be applied to these cases. As the material of the cylinder 61, a material that can be sensed by an existing contact detector mounted in the dispensing mechanism may be used.

First Example

As a first example, a method of correcting a horizontal position in the positional information data with respect to the dispensing position of the reaction disc is described. The automatic analyzer of the first example includes a plurality of dispensing mechanisms each having two horizontal drive shafts that move the dispensing nozzles in the horizontal plane and one vertical drive shaft that moves the dispensing nozzles in the vertical direction. Specific examples thereof are the four reagent dispensing mechanisms 7, 8, 9, and 10 and the two sample dispensing mechanisms 13 and 14 included in FIG. 1. The number and the kinds of the dispensing mechanisms are not limited to the above.

Figure 5:
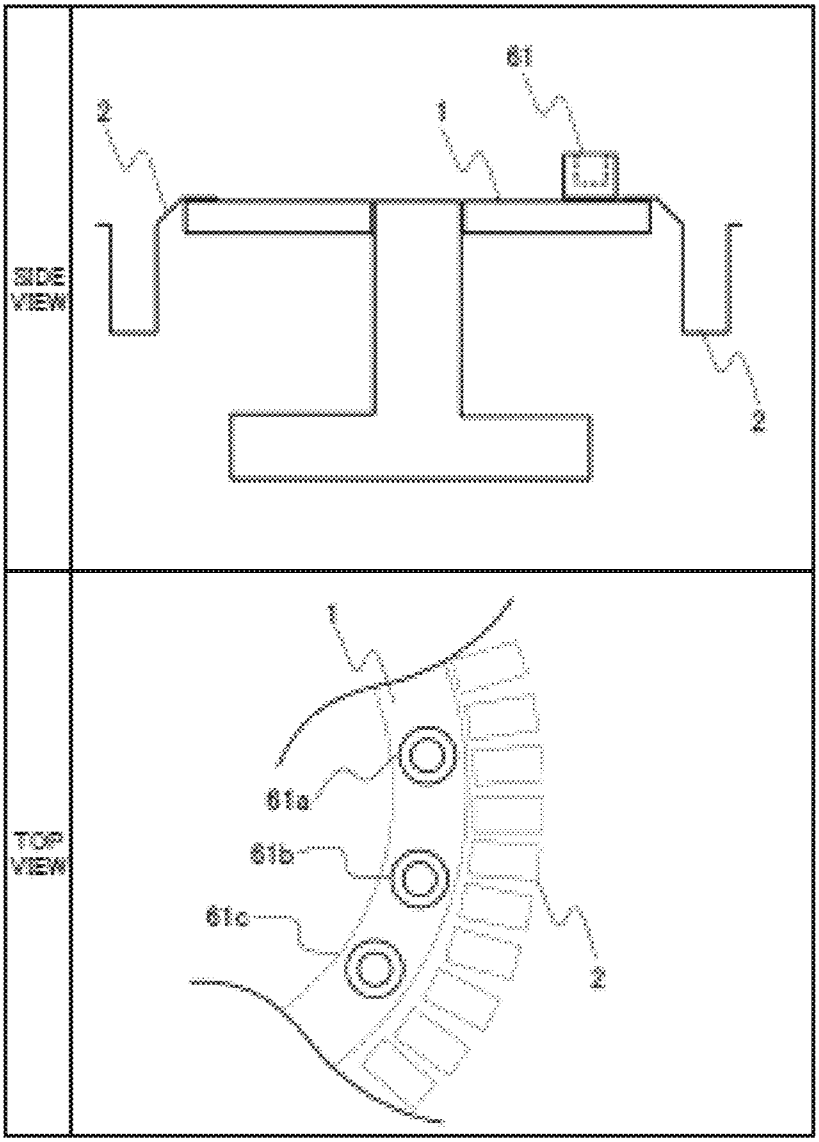
FIG. 5 illustrates an arrangement of the cylindrical member on the reaction disc and a reaction vessel in a first example.

FIG. 5 illustrates the reaction disc 1, the reaction vessels 2 attached to the reaction disc 1, and the cylinders 61*a*, 61*b*, and 61*c*. The upper part is a side view, and the lower part is a top view. When the reaction disc 1 rotates, the reaction vessel 2 attached to the reaction disc 1 and the cylinders 61*a*, 61*b*, and 61*c* move while maintaining the relative positional relationship.

Figure 6A:
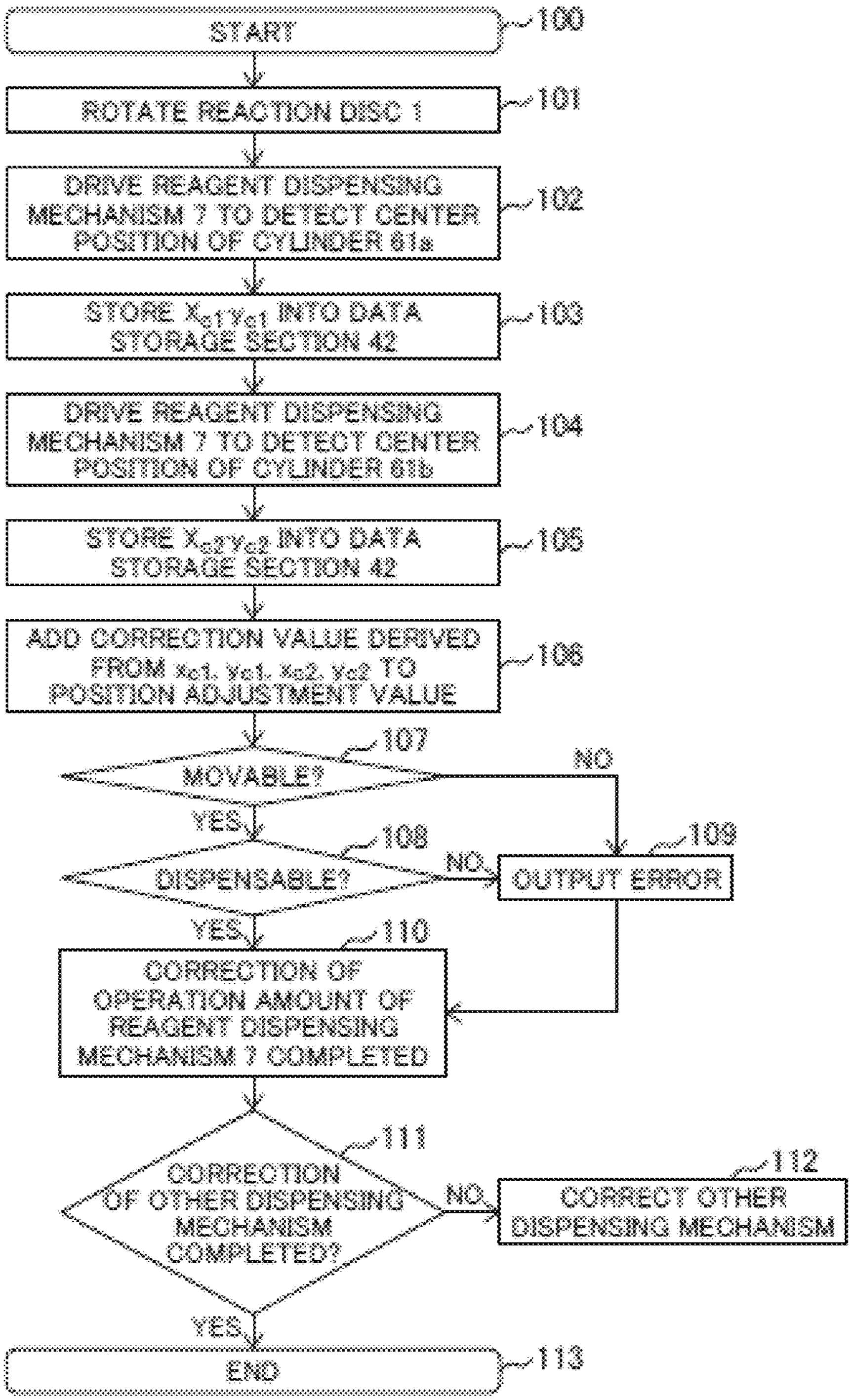
FIG. 6A is a flowchart of a horizontal positioning method for the dispensing nozzle in the first example.

FIG. 6A illustrates a flowchart of a horizontal positioning method of a dispensing nozzle of the reagent dispensing mechanism 7 (reagent nozzle). The adjustment of the dispensing mechanism 7 is automatically started by the control section 41, for example, at each activation of a device. In addition, when an event that may cause deformation of the mechanism base 35 occurs, the control section 41 automatically executes this flow to be able to avoid the continuation of the analysis with the position deviation of the dispensing nozzle 54. Furthermore, the user may instruct the execution of this flow at any timing with the input section 43.

First, the reaction disc 1 is rotated to move the cylinders 61*a* and 61*b* into the operable range of the reagent nozzle 7*a* (Step 101). At this time, the reaction disc 1 is rotated so that the cylinder 61 used for calculating the correction amount always comes to the same position during execution of this flow. The control section 41 reads the positional information data (position adjustment value) for the cylinder 61*a* stored in the data storage section 42 and horizontally moves the reagent nozzle 7*a* to the inner wall surface side of the cylinder 61*a*. Since the position adjustment value is corrected so that the reagent nozzle 7*a* moves to the center position of the cylinder 61*a* at the time of previous position adjustment, even if warpage occurs, the reagent nozzle 7*a* can generally be moved within the inner wall surface of the cylinder 61*a*. Subsequently, the shaft of the dispensing mechanism is driven so as to move the tip of the reagent nozzle 7*a* to a position lower than the upper surface of the cylinder 61*a*. The $\theta_1$ arm and the $\theta_2$ arm are driven in a state in which the tip of the reagent nozzle 7*a* is inserted into the inner wall surface of the cylinder 61*a*, so that the reagent nozzle 7*a* is in contact with the inner wall surface of the cylinder 61*a*. By repeating this at least three times while changing the contact points, center positions $x_{c1}$ and $y_{c1}$ of the cylinder 61*a* are calculated (Step 102). The calculated center positions $x_{c1}$ and $y_{c1}$ of the cylinder 61*a* are stored in the data storage section 42 (Step 103).

Subsequently, the control section 41 reads the positional information data (position adjustment value) with respect to the cylinder 61*b* stored in the data storage section 42 and horizontally moves the reagent nozzle 7*a* to the inner side of the inner wall surface of the cylinder 61*b*. Subsequently, the shaft of the dispensing mechanism is driven to move the tip of the reagent nozzle 7*a* to the position lower than the upper surface of the cylinder 61*b*. The $\theta_1$ arm and the $\theta_2$ arm are driven in a state in which the tip of the reagent nozzle 7*a* is inserted into the inner wall surface of the cylinder 61*b*, and the reagent nozzle 7*a* is brought into contact with the inner wall surface of the cylinder 61*b*. By repeating this at least three times while changing the contact points, center positions $x_{c2}$ and $y_{c2}$ of the cylinder 61*b* are calculated (Step 104). The calculated center position $x_{c2}$ and $y_{c2}$ of the cylinder 61*b* are stored in the data storage section 42 (Step 105).

The control section 41 obtains the correction value for correcting the positional deviation based on the deformation of the mechanism base 35, based on the positional relationship of the center position of the two cylinders 61 (the cylinders 61*a* and 61*b* in this example) installed in the reaction disc 1 stored in the data storage section 42 with the center position of the reaction vessel 2. Details thereof are described with reference to FIGS. 7A and 7B.

Figure 7A:
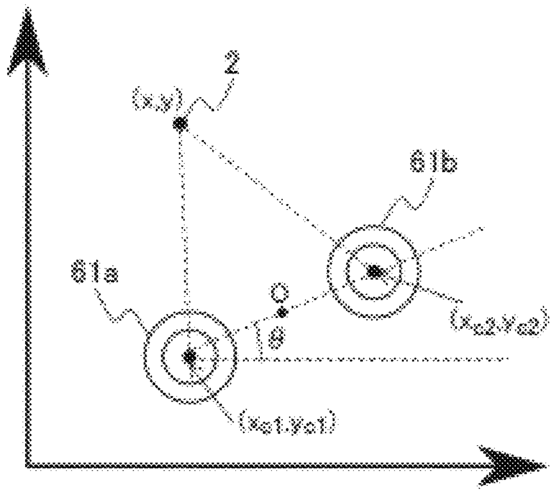
FIG. 7A is an explanatory view of a method for calculating a correction value.
Figure 7B:
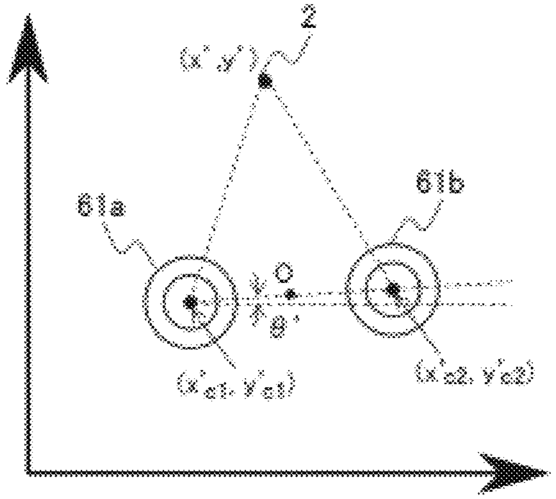
FIG. 7B is an explanatory view of a method for calculating a correction value.

The origin of the coordinates of FIGS. 7A and 7B is the rotation axis of the $\theta_1$ arm 52. FIG. 7A illustrates the coordinates of the central positions of the reaction vessel 2 and the cylinders 61*a* and 61*b* in a normal state (at the time of previous position adjustment). The center position of the reaction vessel 2 is the stop position where the dispensing nozzle 54 performs dispensing to the reaction vessel 2. FIG. 7B illustrates coordinates of the center positions of the reaction vessel 2 and the cylinders 61*a* and 61*b* after the positional deviation (after the previous position adjustment, when warpage occurs in the mechanism base 35).

Here, all of the reaction vessel 2 and the cylinders 61*a* and 61*b* are mounted on the reaction disc 1 and thus are not influenced by the warpage of the mechanism base 35. That is, in FIGS. 7A and 7B, there is no change in the positional relationship between center positions of the reaction vessel 2 and the cylinders 61*a* and 61*b*. Therefore, the movement of the center position of the reaction vessel 2 due to the positional deviation is calculated as a combination of rotational movement and parallel movement of a triangle with the center positions of the reaction vessel 2 and the cylinders 61*a* and 61*b* as vertices. Hereinafter, a calculation example is provided, but in this calculation example, a midpoint O of a side connecting the center positions of the cylinders 61*a* and 61*b* is calculated as a reference point of the movement.

An angle θ formed by the cylinders 61 in the normal state is expressed by (Equation 1), an angle θ' formed by the cylinders 61 after the positional deviation is expressed by (Equation 2), and an amount of rotation of the triangle Δθ=(θ'−θ) is expressed by (Equation 3).

$$\tan\theta = \frac{y_{c2} - y_{c1}}{x_{c2} - x_{c1}} \quad \text{[Equation 1]}$$

$$\tan\theta' = \frac{y'_{c2} - y'_{c1}}{x'_{c2} - x'_{c1}} \quad \text{[Equation 2]}$$

$$\tan(\Delta\theta) = \tan(\theta' - \theta) = \frac{\tan\theta' - \tan\theta}{1 + \tan\theta'\tan\theta} \quad \text{[Equation 3]}$$

Figure 8A:
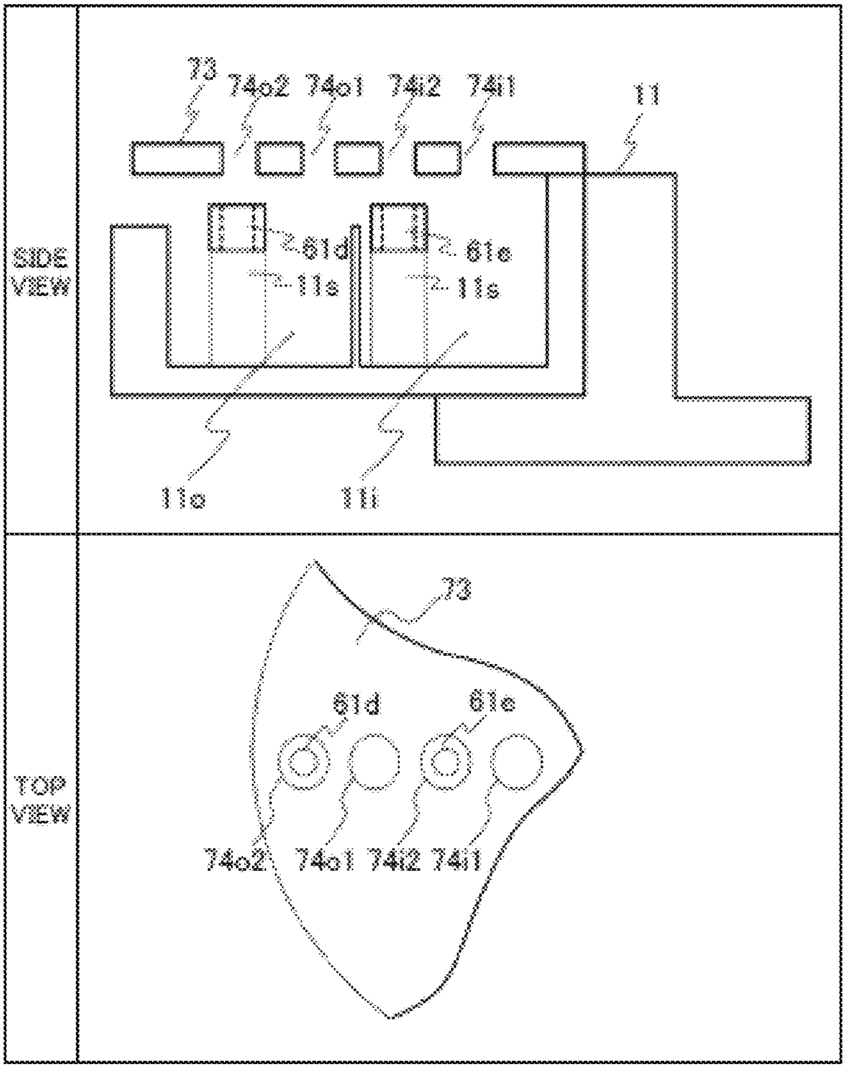
FIG. 8A illustrates an arrangement of the cylindrical members on the reagent disc in a second example.
Figure 8B:
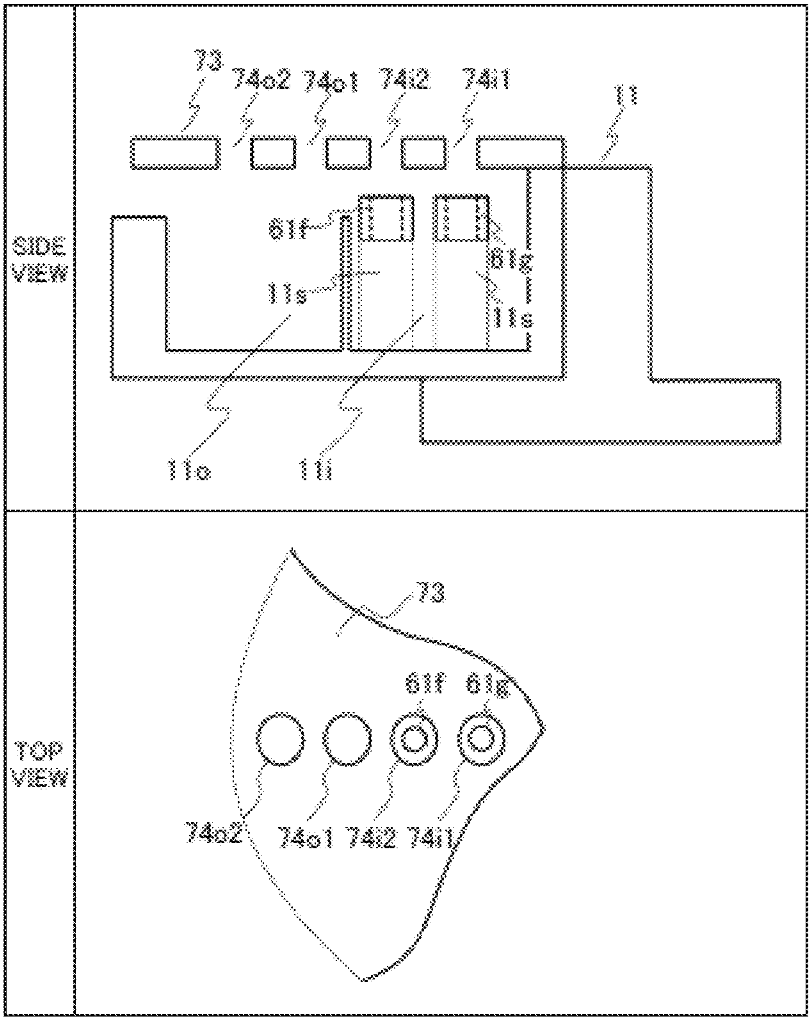
FIG. 8B illustrates an arrangement of the cylindrical members on the reagent disc in the second example.

Since the shape of the triangle is unchanged before and after the positional deviation, the coordinates of the center position of the reaction vessel 2 in FIG. 8B can be calculated by rotating the coordinates of the center position of the reaction vessel 2 with a reference point O in FIG. 7A as an origin by Δθ and translating the coordinates to the position of the reference point O in FIG. 7B. Specifically, the coordinates can be calculated by (Equation 4).

$$\begin{pmatrix} x' \\ y' \end{pmatrix} \begin{pmatrix} \cos(\Delta\theta) & -\sin(\Delta\theta) \\ \sin(\Delta\theta & \cos(\Delta\theta) \end{pmatrix} \begin{pmatrix} x - \frac{x_{c1} + x_{c2}}{2} \\ y - \frac{y_{c1} + y_{c2}}{2} \end{pmatrix} + \begin{pmatrix} \frac{x'_{c1} - x'_{c2}}{2} \\ \frac{y'_{c1} - y'_{c2}}{2} \end{pmatrix} \quad \text{[Equation 4]}$$

The control section 41 calculates the correction value based on calculated center position coordinates x', y' of the reaction vessel 2 after the positional deviation and center position coordinates x, y of the reaction vessel 2 before the positional deviation. The positional information data is updated by adding the calculated correction value to the position adjustment value indicating the XY-plane position corresponding to the stop position where the reagent nozzle 7*a* performs dispensing to the reaction vessel 2, which is stored in the data storage section 42 (Step 106). Therefore, regardless of the deformation of the mechanism base 35, it is possible to position the reagent nozzle 7*a* of the reagent dispensing mechanism 7 at the center position of the reaction vessel 2.

With the above, the reagent dispensing mechanism 7 is correctly positioned to the reaction vessel 2 and thereafter checks whether the dispensing operation of the automatic analyzer is correctly performed.

First, when the reagent nozzle 7*a* is moved by adding the correction value to the position adjustment value, it is determined whether the movement does not exceed a predetermined operation range of the dispensing nozzle (Step 107). For example, when the reagent nozzle cannot move to the target position within an allowed time limit in an operation cycle of the automatic analyzer, it is determined that the movement exceeds the operation range. When the movement is not possible (NO in Step 107), an error is output to the output section 46 to warn the user of abnormality (Step 109).

When the movement is possible (YES in Step 107), it is determined whether the correction value is equal to or less than the range of the correction amount that does not influence the dispensing accuracy checked by experiments in advance (Step 108). For example, when the opening angle of the two arms during dispensing becomes large, the influence of the deflection of the arms becomes large, and thus the position of the reagent nozzle 7*a* is likely to be deviated from the center of the reaction vessel 2. Therefore, for example, the dispensed reagent may hang on the side wall of the reaction vessel 2 to change the dispensing amount, or the insertion amount to the solution of the reaction vessel 2 of the dispensing nozzle may be changed by the deflection of an arm, whereby the dispensing nozzle may not be properly cleaned. When the correction value reaches the correction amount that influences the dispensing accuracy (NO in Step 108), an error indicating that the dispensing and cleaning are impossible is output to the output section 46, and the user is warned of abnormality (Step 109).

When dispensing and washing is possible (YES in Step 108), completion of correction is output to the output section 46 to inform the user that the correction is completed without an error (Step 110). Note that the order of the checking of Step 107 and the checking of Step 108 is arbitrary, and the checking may be reversed or may be performed in parallel. After that, it is determined whether correction is completed for other dispensing mechanisms (Step 111), and if not completed, the other dispensing mechanisms are adjusted (Step 112). When the correction operation is completed for all the dispensing mechanisms, the device is ready for analysis.

In this manner, it is possible to correct the operation amount for other dispensing mechanisms by the same procedure as illustrated in FIG. 6A (Step 112). Here, in the case of an arm mechanism having two rotation axes like the dispensing mechanism illustrated in FIG. 2, if an angle formed by the $\theta_1$ arm 52 and the $\theta_2$ arm 53 becomes close to 180°, the influence of the deflection of the arm increases, whereby the movement accuracy of the dispensing nozzle 54 deteriorates. Therefore, even when correction processing is performed, it is desirable that the opening angle of the two arms does not differ greatly from the opening angle when the dispensing operation is performed. Meanwhile, the automatic analyzer of FIG. 1 includes four reagent dispensing mechanisms and two sample dispensing mechanisms, and it is desirable that the cylinders 61 installed in the reaction disc 1 are shared with a plurality of dispensing mechanisms as many as possible for the calculation of the correction. Therefore, in this example, as illustrated in the lower part of FIG. 5, each dispensing mechanism provided with the three cylinders 61*a* to 61*c* on the reaction disc 1 selects the cylinder 61 at a position where the calculation accuracy of the correction amount does not deteriorate to be used for the calculation of the correction amount.

FIG. 6A illustrates an example of the correction of the reagent dispensing mechanism 7, but the other reagent dispensing mechanisms 8, 9, and 10 are similarly corrected. Differences are that the amount of rotation of the reaction disc 1 in Step 101 is the amount of rotation matched to the dispensing position of each reagent dispensing mechanism, and the correction amount calculation process is performed by using the two cylinders 61 selected for each of the reagent dispensing mechanism as described above.

Figure 6B:
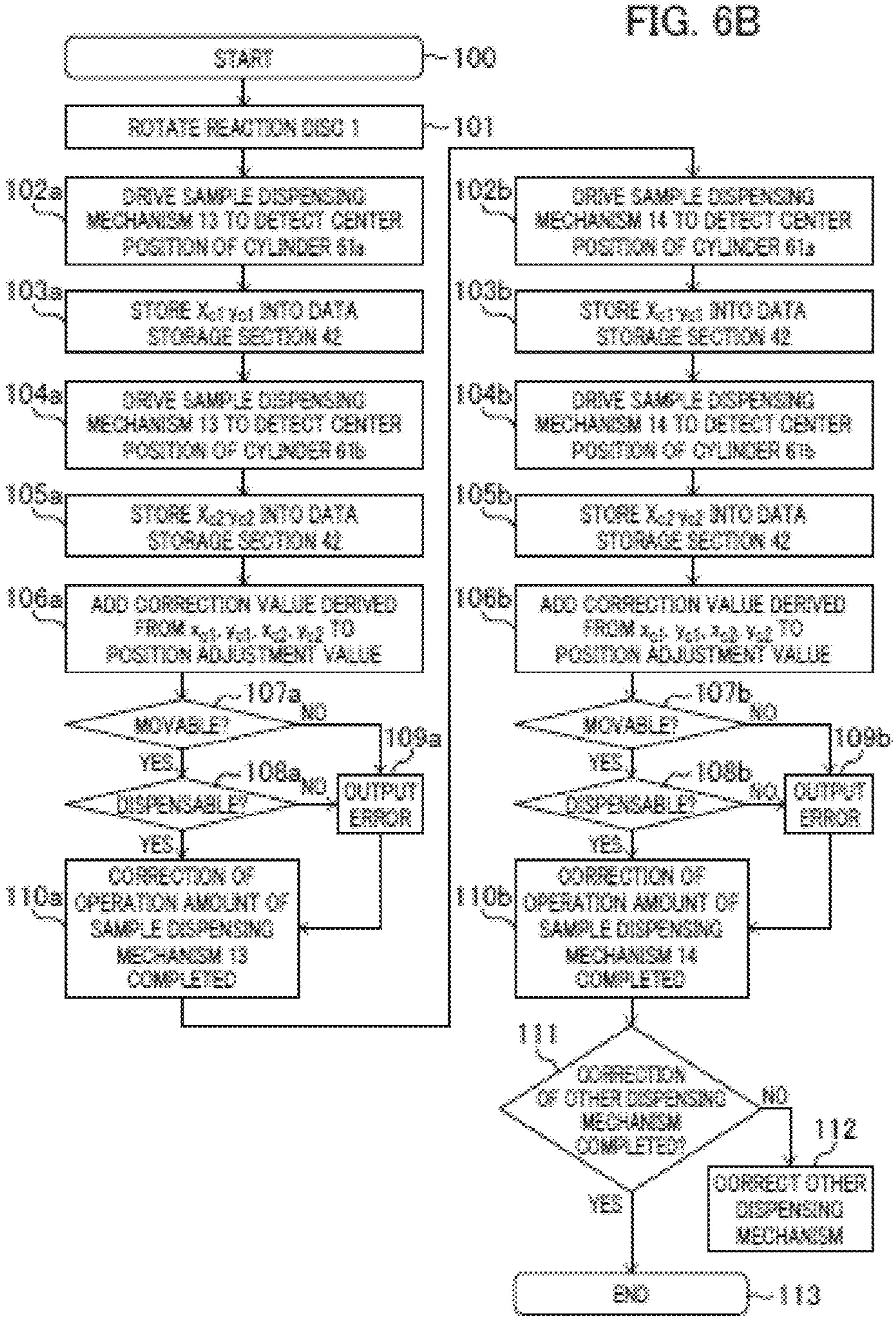
FIG. 6B is a flowchart of a horizontal positioning method for the dispensing nozzle in the first example.

FIG. 6B illustrates an example of the correction of the sample dispensing mechanisms 13 and 14. The sample dispensing mechanisms 13 and 14 have two horizontal drive shafts: one linear mechanism that horizontally moves the dispensing nozzle and one rotating mechanism that rotationally moves the dispensing nozzle, and thus are different from the reagent dispensing mechanism of which both are rotating mechanisms. However, the correction method is the same. In addition, in this case, since the dispensing positions of the sample dispensing mechanisms 13 and 14 are the same, the reaction disc 1 is first rotated, and then the correction amount is calculated for each sample dispensing mechanism.

As described above, in the first example, the method of correcting the positional deviation of the dispensing nozzle with respect to the reaction vessel 2 in the horizontal direction is described for the dispensing mechanism provided with two horizontal drive shafts.

Second Example

As a second example, a method of correcting the horizontal position in the positional information data to the dispensing position of the reagent disc is described. The reagent dispensing mechanisms 7, 8, 9, and 10 of the second example include two horizontal drive shafts that move the dispensing nozzle in the horizontal plane and one vertical drive shaft that moves the dispensing nozzle in the vertical direction. In the second example, similarly to the first example, the cylinder 61 is installed on the reagent disc 11 and corrects the horizontal position by using the cylinder 61.

FIGS. 8A and 8B illustrate arrangement of the cylinders 61 mounted in the reagent disc 11 for positioning. The reagent disc 11 includes two rows of reagent storage spaces (a storage space at inner circumferential side 11*i* and a storage space at outer circumferential side 11*o*) along the inner diameter direction. A reagent disc lid 73 is provided with reagent suction holes 74 for causing the dispensing nozzle 54 to access the reagent bottle 12 during the analysis operation. A combination of the cylinder 61 used for correction of the positional information data can be moved to positions where the cylinders are visible from the reagent suction holes 74 in the top view by rotating the reagent disc 11. Therefore, even when performing the flow described below, the dispensing nozzle can be accessed to the cylinder 61 without opening and closing the reagent disc lid 73.

FIG. 8A illustrates the arrangement of the cylinders 61*d* and 61*e* used for positioning the dispensing positions of the storage space at the outer circumferential side 11*o* to the reagent bottle, and FIG. 8B illustrates the arrangement of the cylinders 61*f* and 61*g* used for positioning the dispensing position of the storage space at inner circumferential side 11*i* to the reagent bottle. The arrangement position of the cylinder 61 is not limited to this example. There is no problem if the cylinders 61 are arranged at positions where the the cylinders are visible from the reagent suction holes 74 or positions where the deflection of the arms of the dispensing mechanism is less influenced, and the dispensing position can be accurately adjusted as described in the first example. In addition, the cylinders 61*d* to 61*g* are arranged on a reagent disc structure 11*s* to be arranged at approximately the same height as the lids of the reagent bottles. In addition, as the cylinders 61*d* to 61*g*, a type without a bottom surface is used. A type with a bottom surface may be used similarly to the first example.

Figure 9:
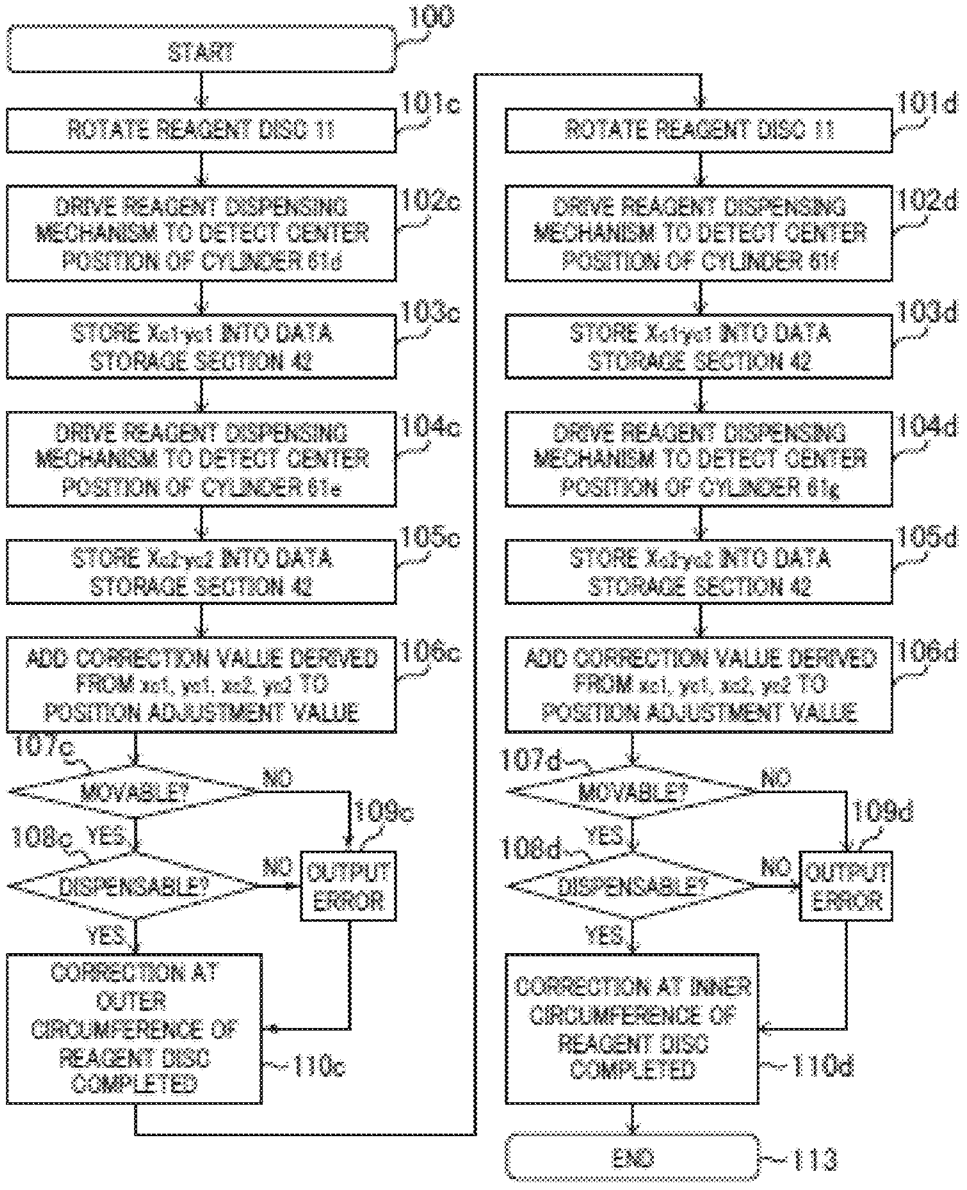
FIG. 9 is a flowchart of a horizontal positioning method for the dispensing nozzle in the second example.

FIG. 9 illustrates a flowchart of the horizontal positioning method of the dispensing nozzle of the reagent dispensing mechanism. This flow is similar to that in the first example, the same reference numerals are used for the similar process, and the redundant explanations are omitted. Here, the flow is that the reagent disc is positioned in the storage space at the outer circumferential side of the reagent disc with respect to the reagent bottle, and then the reagent disc is positioned in the storage space at the inner circumferential side with respect to the reagent bottle, but this order may be reversed.

In Step 101, the reagent disc 11 is rotated so that the cylinders 61 to be used for positioning (the cylinders 61*d* and 61*e* on the outer circumferential side, and the cylinders 61*f* and 61*g* on the outer circumferential side) are moved to positions where the dispensing nozzles 54 of the reagent dispensing mechanism to be adjusted are accessible via the reagent suction holes 74. Also in the second example, the correction value can be obtained by the fact that the warpage of the mechanism base 35 is not influenced since all of the reagent bottles 12 and the cylinders 61 are mounted in the reagent disc 11. That is, in the second example, in Step 106, the correction value can be calculated according to the method described by using FIGS. 7A and 7B by reading the center position coordinates x', y' of the opening of the reagent bottle 12 after the positional deviation as the center position coordinates x, y of the opening of the reagent bottle 12 before the positional deviation. When there are a plurality of openings of the reagent bottles 12, the process is performed for each opening.

When a plurality of reagent dispensing mechanisms are provided as in the automatic analyzer illustrated in FIG. 1, a flow of FIG. 9 is performed on each reagent dispensing mechanism.

As above, in the second example, the method of correcting the positional deviation with respect to the reagent bottles 12 of the dispensing nozzles for the dispensing mechanism including two horizontal drive shafts is described.

Third Example

As a third example, a method of correcting a vertical position in the positional information data to the dispensing position of the reaction disc is described. Similarly to the first example, the dispensing mechanism includes two horizontal drive shafts and one vertical drive shaft.

As illustrated in FIGS. 4A to 4C, the positional deviation in the vertical direction occurs due to warpage of the mechanism base 35. Therefore, in the third example, the vertical position is corrected by using the cylinder 61 used for the horizontal position correction.

Figure 10:
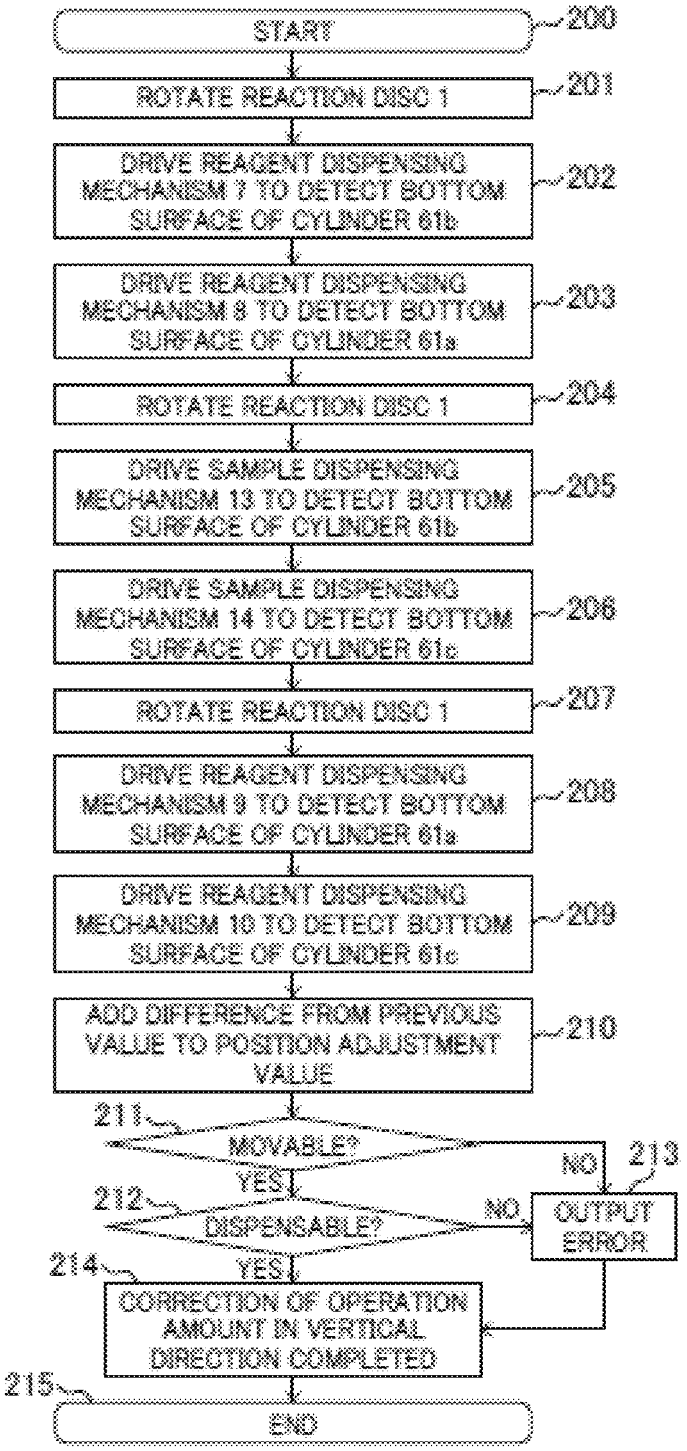
FIG. 10 is a flowchart of a vertical positioning method for the dispensing nozzle in a third example.

FIG. 10 illustrates a flowchart of the vertical positioning method for a dispensing nozzle. The execution timing of this flow is similar to that of the first example.

First, the reaction disc 1 is rotated to move the cylinders 61*a* and 61*b* to the operable range of the reagent nozzles 7*a* and 8*a* (Step 201). The control section 41 reads positional information data stored in the data storage section 42 (position adjustment value), horizontally moves the reagent nozzle 7*a* to the inside of the inner wall surface of the cylinder 61*b*, and horizontally moves the reagent nozzle 8*a* to the inside of the inner wall surface of the cylinder 61*a*. Subsequently, the shaft 51 is driven so that the reagent nozzle 7*a* comes into contact with the bottom surface of the cylinder 61*b*, and the reagent nozzle 8*a* comes into contact with the bottom surface of the cylinder 61*a*, and stores a driving amount in the data storage section 42 (Steps 202 and 203).

Subsequently, the shaft 51 is driven so that the reagent nozzles 7*a* and 8*a* are moved to a position higher than the upper surface of the cylinder 61, and then the reaction disc 1 is rotated to move the cylinders 61*b* and 61*c* to the operable range of the sample nozzles 13*a* and 14*a* (Step 204). Similarly, the shaft 51 is driven so that the sample nozzle 13*a* comes into contact with the bottom surface of the cylinder 61*b*, and the sample nozzle 14*a* comes into contact with the bottom surface of the cylinder 61*c*, and the driving amount is stored in the data storage section 42 (Steps 205 and 206).

Subsequently, the shaft 51 is driven to move the sample nozzles 13*a* and 14*a* to a position higher than the upper surface of the cylinder 61, and then the reaction disc 1 is rotated to move the cylinders 61*a* and 61*c* to the operable range of the reagent nozzles 9*a* and 10*a* (Step 207). Similarly, the shaft 51 is driven so that the reagent nozzle 9*a* comes into contact with the bottom surface of the cylinder 61*a*, and the reagent nozzle 10*a* comes into contact with the bottom surface of the cylinder 61*c*, and the driving amount is stored in the data storage section 42 (Steps 208 and 209).

Since the position adjustment value indicating the driving amount to the stop position in the vertical direction is corrected to match the change in the driving amount to the cylinder 61 in the vertical direction, the dispensing mechanism is correctly positioned in the reaction vessel 2, and thereafter it is checked whether the dispensing operation of the automatic analyzer can be correctly performed accordingly (Steps 211 to 214). The contents of this process are similar to those in the first example (Steps 107 to 110 in the flowchart of FIG. 6A), and thus the redundant explanations are omitted.

This flow may be performed by selecting the cylinder 61 that can most accurately detect the vertical position among the cylinders 61 installed in the reaction disc 1 for each dispensing mechanism.

With the above, in the third example, the method of correcting the positional deviation in the vertical direction to the reaction vessel 2 of the dispensing nozzle with respect to the dispensing mechanism including two horizontal drive shafts is described.

Fourth Example

As a fourth example, a method of correcting a vertical position in the positional information data to the dispensing position of the reaction disc is described. Similarly to the first example, the dispensing mechanism includes two horizontal drive shafts and one vertical drive shaft.

Figure 11:
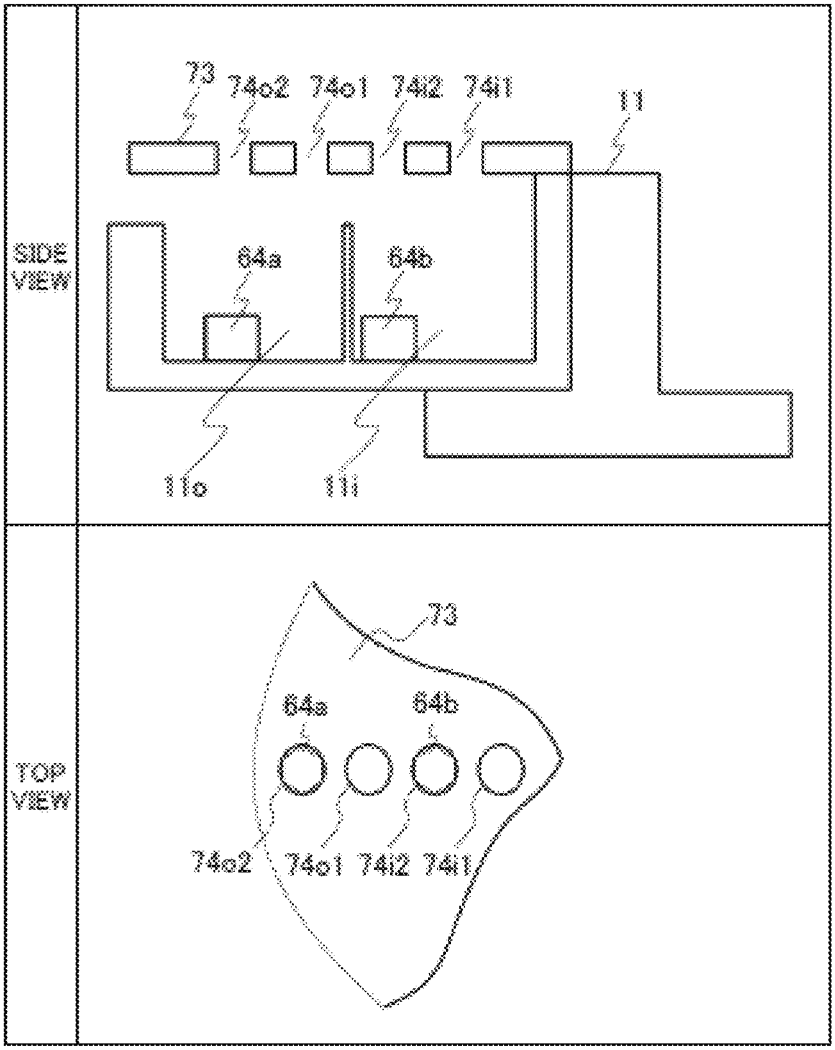
FIG. 11 illustrates an arrangement of base members on the reagent disc in a fourth example.

As illustrated in FIGS. 8A and 8B, the cylinders 61 for correcting the horizontal position are arranged at the same height as the lids of the reagent bottles. However, in order to use up the reagent contained in the reagent bottle 12, it is desirable that the dispensing nozzle is correctly positioned in the vertical direction even in a state in which the remaining amount of the reagent is small. Therefore, with respect to the reagent disc, independently from the cylindrical member used for positioning in the horizontal direction, base members (pedestal) 64 to be used for positioning in the vertical direction are arranged on the bottom surfaces of the reagent discs 11 or around the bottom surfaces. The state is illustrated in FIG. 11.

The pedestal 64*a* is a member for positioning the storage space at the outer circumferential side with respect to the reagent bottle, the pedestal 64*b* is a member for positioning the storage space at the inner circumferential side with respect to the reagent bottle, and the pedestals 64*a* and 64*b* can move at positions where the cylinders are visible from the reagent suction holes 74 in the top view by rotating the reagent disc 11. However, in this case, the dispensing nozzles can access the pedestals 64 without opening and closing the reagent disc lids 73.

Figure 12:
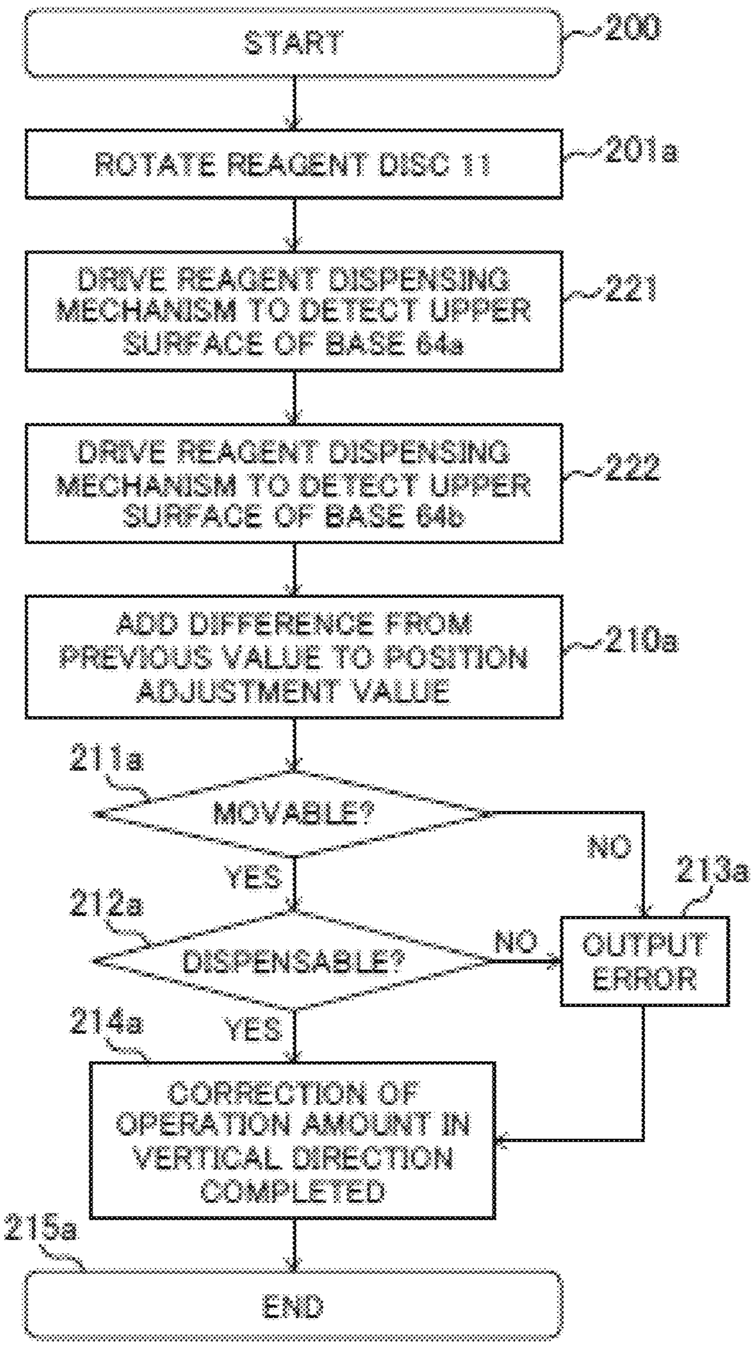
FIG. 12 is a flowchart of a vertical positioning method for the dispensing nozzle in the fourth example.

FIG. 12 is a flowchart of the vertical positioning method for the reagent dispensing nozzle. This flow is similar to that in the third example, the same reference numerals are used for the similar process, and the redundant explanations are omitted. In this case, positioning of the storage space at the outer circumferential side with respect to the reagent bottle in the vertical direction and positioning of the storage space at the inner circumferential side with respect to the reagent bottle in the vertical direction can be performed by access to the pedestal 64*a* on the outer circumferential side and the pedestal 64*b* on the inner circumferential side (Steps 221 and 222). This order may be reversed. The flow of FIG. 12 is performed for each of the reagent dispensing mechanisms.

With the above, in the fourth example, for the reagent dispensing mechanism including the two horizontal drive shafts, the method of correcting the positional deviation in the vertical direction with respect to the reagent bottle 12 of the dispensing nozzle is described.

Fifth Example

Figure 13:
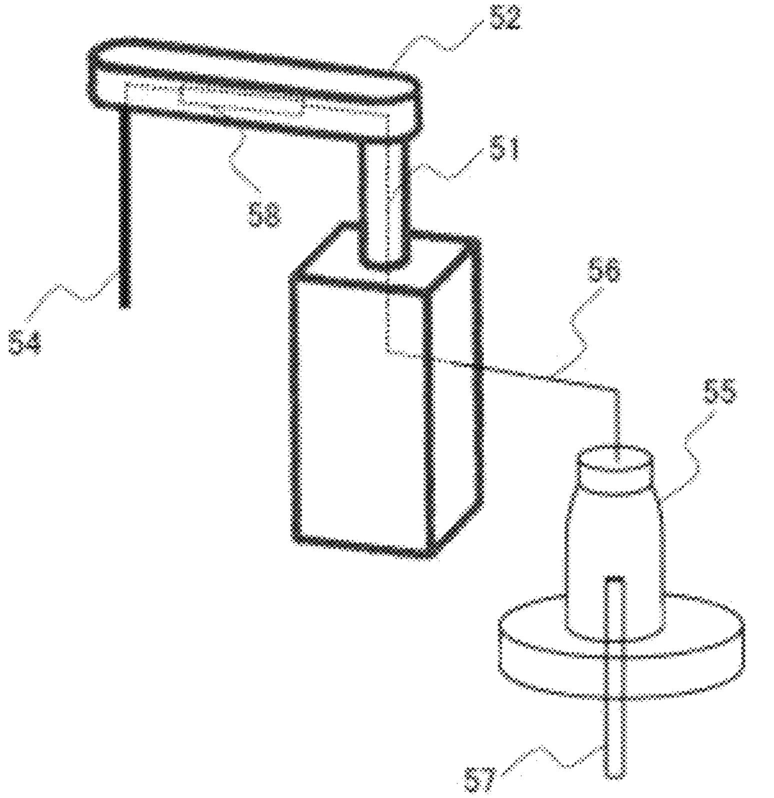
FIG. 13 illustrates an exemplary structure of a dispensing mechanism having one horizontal drive shaft.

As a fifth example, the horizontal positioning method for the reaction vessel 2 of the dispensing nozzle in the case of the dispensing mechanism including one horizontal drive shaft and one vertical drive shaft is described. The example of the dispensing mechanism according to the fifth example is illustrated in FIG. 13. In this dispensing mechanism, one end portion of the $\theta_1$ arm 52 is attached, rotatably in an XY plane, to the upper end position of the shaft 51 that can be driven in the vertical (Z axis direction). In addition, the dispensing nozzle 54 is attached to the other end portion that is the free end of the $\theta_1$ arm 52 so as to extend downward in the Z axis direction. The same configurations as in FIG. 2 are indicated by the same reference numerals, and the redundant explanations are omitted.

Figure 14:
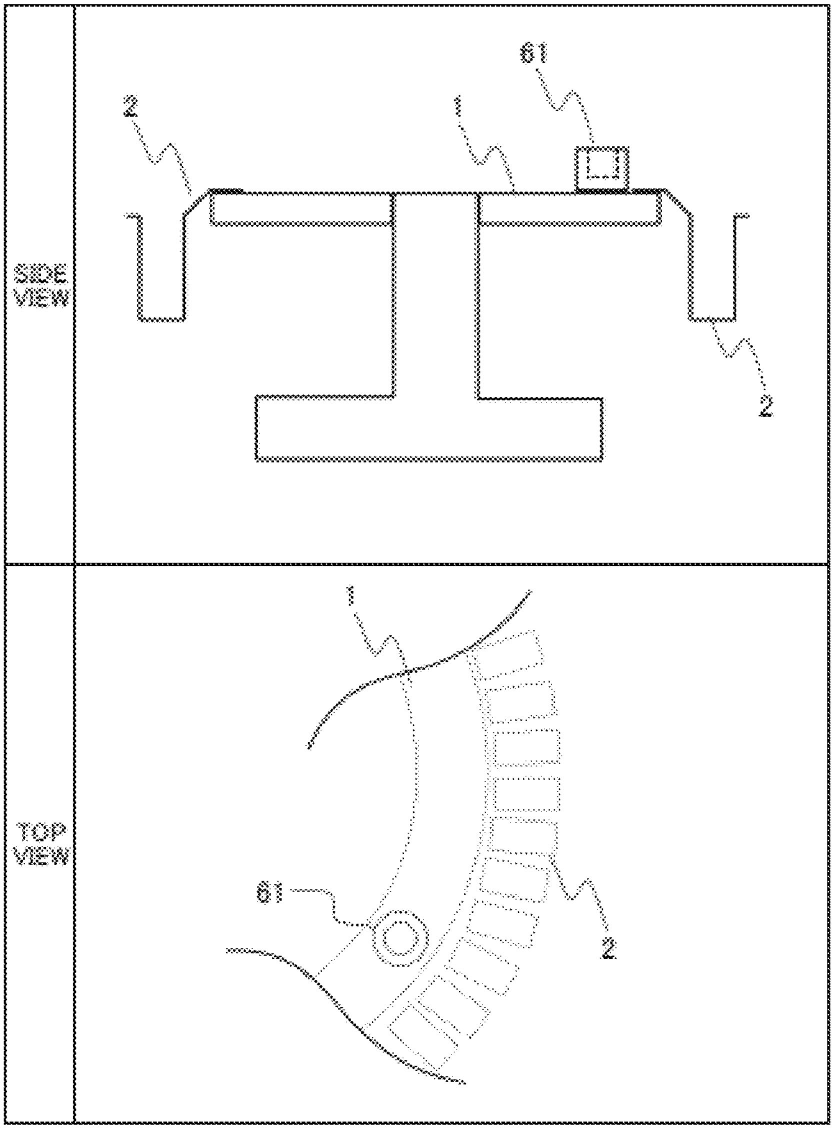
FIG. 14 illustrates an arrangement of the cylindrical member on the reaction disc and the reaction vessel in a fifth example.

FIG. 14 illustrates the reaction disc 1 and the reaction vessel 2 and the cylinder 61 that are attached to the reaction disc 1. Here, an example in which one cylinder 61 is attached to the reaction disc 1 is described.

Since the dispensing mechanism in the fifth example only includes one horizontal drive shaft, the dispensing nozzle 54 can be brought into contact with the inner wall surface 62 of the cylinder 61 at only two points at maximum by driving the dispensing mechanism. Therefore, in the fifth example, both the dispensing mechanism and the reaction disc 1 are driven in order to calculate the relative position between the dispensing mechanism and the center position of the cylinder 61.

Figure 15:
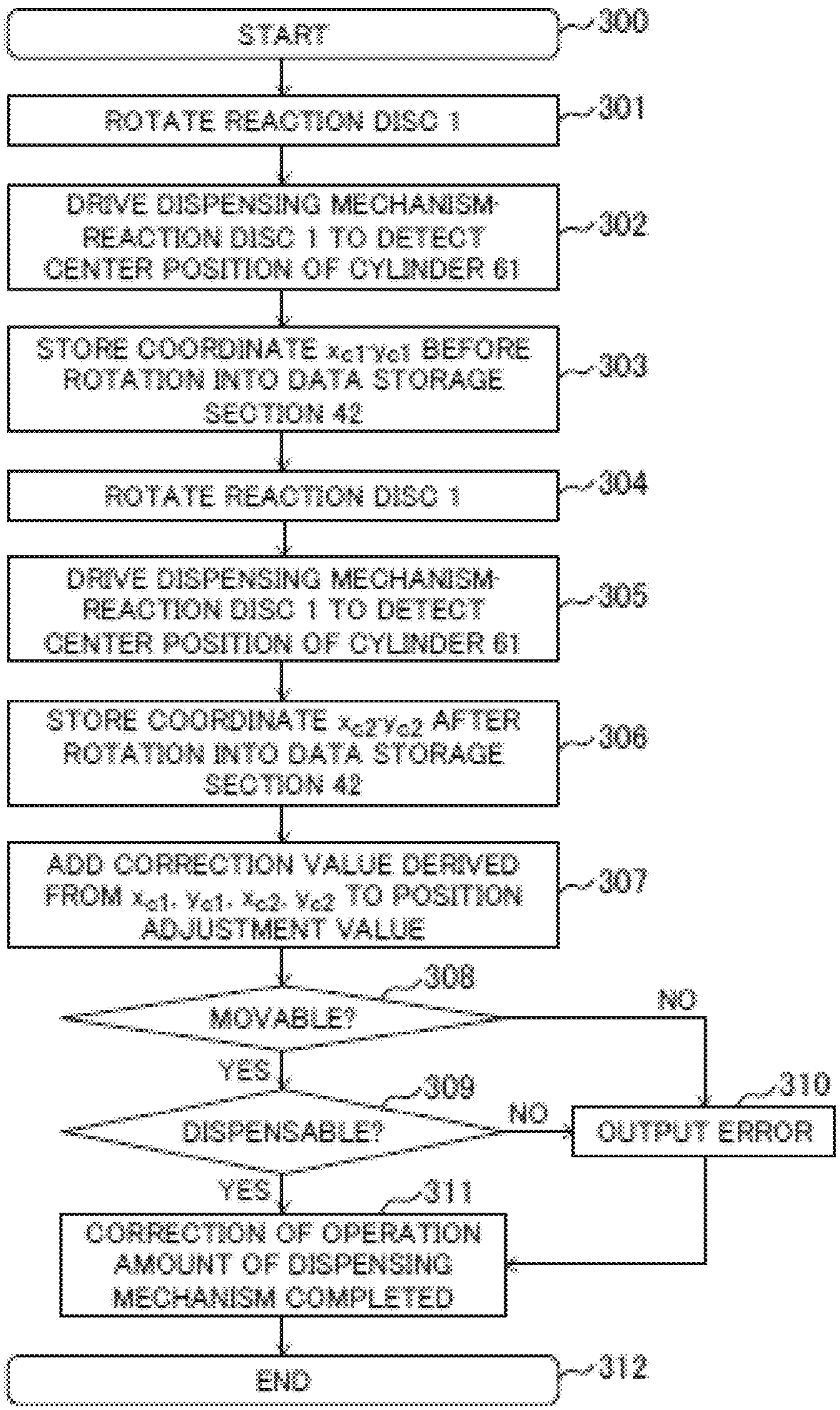
FIG. 15 is a flowchart of a horizontal positioning method for the dispensing nozzle in the fifth example.

FIG. 15 illustrates a flowchart of the horizontal positioning method for the dispensing nozzle in the fifth example. The execution timing of this flow is also similar to the first example.

Figure 16A:
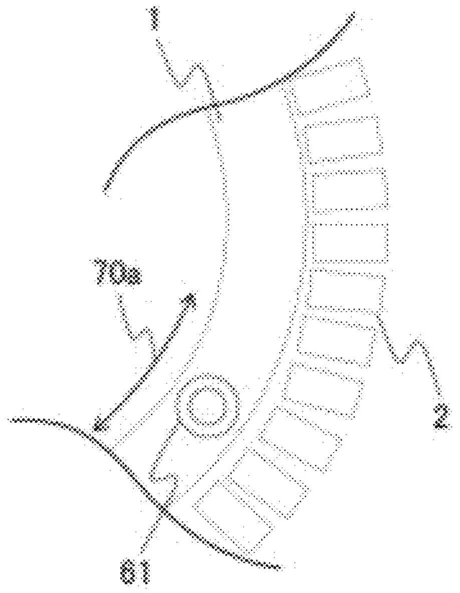
FIG. 16A is a top view of the reaction disc when the cylindrical member is located at a first position.

First, the reaction disc 1 is rotated to move the cylinder 61 to the first position of the operable range of the dispensing nozzle 54 (Step 301). The first position is always the same position at the time of the execution of this flow. This state (top view) is illustrated in FIG. 16A. The control section 41 reads positional information data stored in the data storage section 42 (position adjustment value) and horizontally moves the dispensing nozzle 54 to the inside of the inner wall surface of the cylinder 61. Subsequently, the shaft 51 is driven so that the tip of the dispensing nozzle 54 is moved to a position lower than the upper surface of the cylinder 61. The $\theta_1$ arm 52 is driven in a state in which the tip of the dispensing nozzle 54 enters the inner wall surface of the cylinder 61, and the dispensing nozzle 54 is brought into contact with the inner wall surface of the cylinder 61. Accordingly, the contact point positional information of the two points can be obtained. This operation is repeated two or more times by slightly rotating the reaction disc 1 (illustrated with an arrow 70*a* in FIG. 16A). The contact point positional information when the cylinder 61 is at the first position is obtained by performing coordinate transformation in which the coordinates of the contact point obtained by rotating the reaction disc 1 are reversely rotated by the rotation of the reaction disc 1. With the above, the center positions $x_{c1}$ and $y_{c1}$ of the cylinder 61 are calculated by contact point positional information of three or more contact points with respect to the cylinder 61 at the first position (Step 302). Since an error in the amount of rotation of the reaction disc 1 results in an error in the center position of the cylinder 61, it is desirable that the amount of rotation of the reaction disc 1 in Step 302 is as small as possible. The calculated center positions $x_{c1}$ and $y_{c1}$ of the cylinder 61 are stored in the data storage section 42 (Step 303).

Figure 16B:
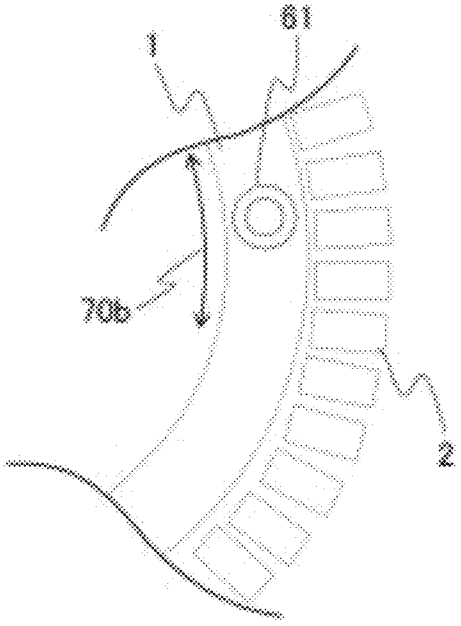
FIG. 16B is a top view of the reaction disc when the cylindrical member is located at a second position.

Further, the shaft 51 is driven to move the tip of the dispensing nozzle 54 to the position higher than the upper surface of the cylinder 61, and then the reaction disc 1 is rotated to move the cylinder 61 to the second position that is in the operable range of the dispensing nozzle 54 but is different from the first position (Step 304). The second position is also always the same position at the time of the execution of this flow. This state (top view) is illustrated in FIG. 16B. Also when the cylinder 61 is at the second position, as in the same manner as in a case where the cylinder 61 is at the first position, the center positions $x_{c2}$ and $y_{c2}$ of the cylinder 61 are calculated (Step 305), and the calculated center positions $x_{c2}$ and $y_{c2}$ of the cylinder 61 are stored in the data storage section 42 (Step 306).

Here, the amount of rotation of the reaction disc 1 when the cylinder 61 is moved from the first position to the second position is larger than the amount of rotation of the reaction disc when the center position of the cylinder 61 is obtained (FIGS. 16A and 16B). As a result, the accuracy of the positioning can be increased.

In the fifth example, all of the reaction vessel 2 and the cylinders 61 are mounted on the reaction disc 1, and thus the correction value can be obtained by using the feature of not being influenced by the warpage of the mechanism base 35. Specifically, in Step 307, the correction value can be calculated in the method described with reference to FIGS. 7A and 7B.

The contents of the process of Steps 308 to 311 are similar to those in the first example (Steps 107 to 110 in the flowchart of FIG. 6A), and thus the redundant explanations are omitted.

With the above, in the fifth example, for the dispensing mechanism including one horizontal drive shaft, the method of correcting the positional deviation in the horizontal direction with respect to the reaction vessel 2 of the dispensing nozzle is described. In addition, in this example, two vertices of the triangle illustrated in FIGS. 7A and 7B are made by moving the one cylinder 61, and the correction value is calculated. However, it is possible to make Step 304 unnecessary by arranging the cylinders 61 at the first position and the second position described above.

With the above, the invention is described based on the first to fifth examples. The invention is not limited to the above examples, and various deformations are included. For example, the shape of the cylindrical member 61 may not be cylindrical but may be a member serving as a mark for accurately specifying a position in the XY plane. The dispensing nozzle 54 is not required to be brought into contact to search for such members, as long as the position can be specified with necessary accuracy. In addition, even when the member is searched for by bringing the dispensing nozzle 54 into contact, the structure of the dispensing mechanism may have a 2-axis linear drive shaft arm or may have a two-axis arm including a linear drive shaft and a rotary drive shaft.

It is desirable to search for at least two positions serving as marks (the center positions of the cylinders 61 illustrated in FIGS. 7A and 7B). In the examples, both a case of setting positions serving as a plurality of marks by installing a plurality of members and a case of setting positions serving as a plurality of marks by rotating a disc are described, but any one may be employed. In addition, the invention may be applied to a case of providing a plurality of members to a mechanism without a rotating mechanism and positioning of the corresponding mechanism and the dispensing machine.

Since the reaction disc 1, the reagent disc 11, and the dispensing mechanisms 7, 8, 9, 10, 13, and 14 are mechanisms independent from each other, the first to fifth examples may be performed in parallel.

The above-described examples are described in detail in order to explain the invention in an easy-to-understand manner and are not necessarily limited to those having all the configurations described. In addition, it is possible to replace a part of a certain example with the configuration of another example or to add the configuration of a certain example to the configuration of another example. Moreover, it is also possible to add, delete, or replace a part of the configuration of each example with another configuration.

Also, each configuration, function, and processing unit described above may be implemented partially or entirely as, for example, an integrated circuit or other hardware. Further, each configuration, function, and the like described above may be implemented by a processor interpreting and executing a program for implementing each function. That is, the configuration, function, and the like may be implemented by software. Information such as programs, tables, and files that implement each function can be stored in a storage device such as a memory, a hard disc, a solid state drive (SSD), and a storage media such as an IC card, an SD card, and a DVD.

In addition, the control lines and information lines that are considered necessary for explanation are illustrated and not all the control lines and information lines necessary for the product are illustrated. In practice, it may be considered that almost all configurations are interconnected.

REFERENCE SIGNS LIST

1: reaction disc, 2: reaction vessel, 3: cleaning mechanism, 4: spectrophotometer, 5, 6: stirring mechanism, 7, 8, 9, 10: reagent dispensing mechanism, 7*a*, 8*a*, 9*a*, 10*a*: reagent nozzle, 11: reagent disc, 11*i*: storage space at inner circumferential side, 11*o*: storage space at outer circumferential side, 11*s*: reagent disc structure, 12: reagent bottle, 13, 14: sample dispensing mechanism, 13*a*, 14*a*: sample nozzle, 15, 16: sample nozzle cleaning vessel, 17: sample container, 18: rack (transport member), 19: sample transport mechanism, 20: reagent pump, 21: sample pump, 22: cleaning pump, 30, 31, 32, 33: reagent nozzle cleaning vessel, 35: mechanism base, 41: control section, 42: data storage section, 43: input section, 44: measurement section, 45: analysis section, 46: output section, 51: shaft, 52: $\theta_1$ arm, 53: $\theta_2$ arm, 54: dispensing nozzle, 55: syringe, 56: tube, 57: plunger, 58: contact detector, 61, 61*a*, 61*b*, 61*c*, 61*d*, 61*e*, 61*f*, 61*g*: cylindrical member, 62: inner wall surface, 64*a*, 64*b*: base member, 70: arrow, 73: reagent disc lid, 74: reagent suction hole

The invention claimed is:

1. An automatic analyzer, comprising:

a mechanism base;

a dispensing mechanism which is configured to be disposed on the mechanism base, and configured to have at least one horizontal drive shaft and one vertical drive shaft for moving a dispensing nozzle;

a first mechanism which is configured to be disposed on the mechanism base, and comprises a stop position at which the dispensing nozzle is stopped;

a control section configured to position the dispensing nozzle with the stop position of the first mechanism; and a data storage section, wherein:

a member is configured to be disposed on the first mechanism indicating a predetermined first position and a predetermined second position of the first mechanism;

the horizontal drive shaft of the dispensing mechanism is configured to move the dispensing nozzle in an XY plane;

the vertical drive shaft of the dispensing mechanism is configured to move the dispensing nozzle in a Z direction vertical to the XY plane;

the data storage section is configured to store a position adjustment value indicating an XY-plane position corresponding to the stop position, a position adjustment value indicating an XY-plane position of the member at the first position, and a position adjustment value indicating an XY-plane position of the member at the second position;

the member is configured to be sensed by the dispensing nozzle in order to detect the first position and the second position; and the control section is configured to calculate a correction value of the position adjustment value indicating the XY-plane position corresponding to the stop position based on a positional relation among the stop position, the first position, and the second position, which are configured to be represented by the position adjustment values as the XY-plane positions, and are further configured to be stored in the data storage section, and the XY-plane positions corresponding to the first and the second positions, which are configured to be detected using the dispensing nozzle.

2. The automatic analyzer according to claim 1, wherein:

the dispensing mechanism includes two horizontal drive shafts for moving the dispensing nozzle;

the member is a cylindrical member, and a first cylindrical member indicating the first position and a second cylindrical member indicating the second position are disposed on the first mechanism;

the dispensing nozzle is brought into contact with three or more points on an inner wall surface of the cylindrical member for detecting a contact point position; and the control section calculates a center position of the first cylindrical member from the detected contact point position of the first cylindrical member, which is set as the first position, and a center position of the second cylindrical member from the detected contact point position of the second cylindrical member, which is set as the second position.

3. The automatic analyzer according to claim 2, comprising the multiple dispensing mechanisms including a first dispensing mechanism and a second dispensing mechanism, wherein: at least one of the cylindrical members is shared between the first and the second cylindrical members for calculating a correction value of the position adjustment value indicating the XY-plane position corresponding to the stop position of the first dispensing mechanism, and the first and the second cylindrical members are configured for calculating a correction value of the position adjustment value indicating the XY-plane position corresponding to the stop position of the second dispensing mechanism.

4. The automatic analyze according to claim 2, wherein:

the data storage section is configured to store the position adjustment value indicating a Z-direction position corresponding to the stop position, and the position adjustment value indicating a Z-direction position of the first cylindrical member or the second cylindrical member;

the dispensing nozzle is brought into contact with a bottom surface of the first cylindrical member or the second cylindrical member to detect the Z-direction position of the cylindrical member; and the control section is configured to calculate a correction value of the position adjustment value indicating the Z-direction position corresponding to the stop position based on the position adjustment value indicating the Z-direction position of the first cylindrical member or the second cylindrical member, which is stored in the data storage section, and the Z-direction position of the first cylindrical member or the second cylindrical member, which is detected using the dispensing nozzle.

5. The automatic analyzer according to claim 2, wherein:

the first mechanism is a reaction disc; and the stop position is set within a reaction vessel disposed on the reaction disc.

6. The automatic analyzer according to claim 2, wherein: the first mechanism is a reagent disc on which a reagent bottle is disposed; and each of the first cylindrical member and the second cylindrical member is configured to be moved to a position where each of the first and the second cylindrical members is visible through each reagent suction hole formed in a reagent disc lid, and has substantially the same height as that of a lid of the reagent bottle.

7. The automatic analyzer according to claim 2, wherein: a base member is disposed on a bottom surface of the reagent disc or a position around the bottom surface, and movable to a position where the base member is visible through the reagent suction hole formed in the reagent disc lid; the data storage section is configured to store the position adjustment value indicating the Z-direction position corresponding to the stop position, and the position adjustment value indicating the Z-direction position of the base member; the dispensing nozzle is brought into contact with an upper surface of the base member to detect the Z-direction position of the base member; and the control section is configured to calculate a correction value of the position adjustment value indicating the Z-direction position corresponding to the stop position based on the position adjustment value indicating the Z-direction position of the base member, which is stored in the data storage section, and the Z-direction position of the base member, which is detected using the dispensing nozzle.

8. The automatic analyzer according to claim 2, wherein: the dispensing mechanism includes one horizontal drive shaft for moving the dispensing nozzle; the first mechanism is a disc to be rotationally driven around the center as an axis; and the member is a cylindrical member; when the cylindrical member is at the first position, the dispensing nozzle is brought into contact with two points on an inner wall surface of the cylindrical member for detecting a contact point position; and when the disc is configured to be rotationally driven to dislocate the cylindrical member from the first position, the dispensing nozzle is brought into contact with two points on the inner wall surface of the cylindrical member for detecting a contact point position; and the control section is configured to calculate a center position of the cylindrical member based on the detected contact point position of the cylindrical member at the first position, and a contact point position of the cylindrical member, which has been obtained through coordinate conversion of the contact point position of the cylindrical member detected in the state dislocated from the first position into the contact point position of the cylindrical member at the first position.

9. The automatic analyzer according to claim 8, wherein: the disc is configured to be rotationally moved to bring the cylindrical member into the second position; and rotational drive amount for the disc to move the cylindrical member from the first position to the second position is larger than rotational drive amount for the disc to obtain the center position of the cylindrical member.

10. The automatic analyzer according to claim 1, wherein the control section is configured to output a warning of abnormality if movement of the dispensing nozzle to the stop position in accordance with the position adjustment value corrected by the calculated correction value exceeds a prescribed operation range of the dispensing nozzle.

11. The automatic analyzer according to claim 10, wherein the control section is configured to output a warning of abnormality if the calculated correction value exceeds a prescribed range of correction quantity.

12. The automatic analyzer according to claim 1, wherein the control section is configured to calculate the correction value of the position adjustment value indicating the XY-plane position corresponding to the stop position at each activation of the automatic analyzer.

13. The automatic analyzer according to claim 1, wherein the position adjustment value indicating the XY-plane position of the member at the first position and the position adjustment value indicating the XY-plane position of the member at the second position are predetermined values stored in a normal state before positional deviation of the first mechanism relative to the dispensing mechanism occurs, and wherein the control section is configured to calculate the correction value based on a comparison between (i) the stored position adjustment value indicating the XY-plane position of the member at the first position and the detected XY-plane position corresponding to the first position, and (ii) the stored position adjustment value indicating the XY-plane position of the member at the second position and the detected XY-plane position corresponding to the second position, such that the correction value compensates for positional deviation caused by deformation of the mechanism base.

* * * * *